(12) United States Patent
Nagase et al.

(10) Patent No.: US 9,087,047 B2
(45) Date of Patent: Jul. 21, 2015

(54) TEXT PROOFREADING APPARATUS AND TEXT PROOFREADING METHOD USING POST-PROOFREADING SENTENCE WITH HIGHEST DEGREE OF SIMILARITY

(71) Applicant: FUJITSU LIMITED, Kawasaki-shi (JP)

(72) Inventors: Tomoki Nagase, Kawasaki (JP); Yuchang Cheng, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 268 days.

(21) Appl. No.: 13/711,144

(22) Filed: Dec. 11, 2012

(65) Prior Publication Data
US 2013/0246048 A1 Sep. 19, 2013

(30) Foreign Application Priority Data
Mar. 19, 2012 (JP) .................................. 2012-062759

(51) Int. Cl.
G06F 17/27 (2006.01)
G06F 17/28 (2006.01)
G06F 17/22 (2006.01)

(52) U.S. Cl.
CPC ............ *G06F 17/28* (2013.01); *G06F 17/2223* (2013.01); *G06F 17/273* (2013.01)

(58) Field of Classification Search
CPC ......... G06F 17/21; G06F 17/24; G06F 17/27; G06F 17/2785; G06F 17/2735; G10L 15/1822
USPC .......................................................... 704/9
See application file for complete search history.

(56) References Cited

U.S. PATENT DOCUMENTS

| | | | |
|---|---|---|---|
| 5,099,425 A * | 3/1992 | Kanno et al. | 704/9 |
| 6,125,377 A * | 9/2000 | Razin | 715/234 |
| 6,490,563 B2 * | 12/2002 | Hon et al. | 704/260 |
| 7,383,172 B1 * | 6/2008 | Jamieson | 704/9 |
| 7,461,047 B2 * | 12/2008 | Masuichi et al. | 706/62 |
| 7,640,158 B2 * | 12/2009 | Detlef et al. | 704/235 |
| 7,831,912 B2 * | 11/2010 | King et al. | 715/708 |

(Continued)

FOREIGN PATENT DOCUMENTS

| | | |
|---|---|---|
| JP | 05-120275 | 5/1993 |
| JP | 07-085050 | 3/1995 |

*Primary Examiner* — Michael N Opsasnick
(74) *Attorney, Agent, or Firm* — Fujitsu Patent Center

(57) ABSTRACT

A Japanese proofreading apparatus has a correction history corpus, a proofreading candidate generation unit, a proofreading availability determination unit, and an automatic proofreading unit. The correction history corpus stores negative sentences as post-proofreading sentences and positive example sentences as post-proofreading sentences, in association with each other. The proofreading candidate generation unit acquires the post-proofreading sentences corresponding to the pre-proofreading sentences from the correction history corpus, according to characteristics of a proofreading target sentence. The proofreading availability determination unit selects, from the post-proofreading sentences acquired by the proofreading candidate generation unit, post-proofreading sentences with degrees of similarity between the proofreading target sentence and the post-proofreading sentences equal to or more than a predetermined threshold value, as proofreading candidates. The automatic proofreading unit proofreads the proofreading target sentence, using, out of the post-proofreading sentences selected by the proofreading availability determination unit, a post-proofreading sentence with the highest degree of similarity.

3 Claims, 25 Drawing Sheets

(56) References Cited

U.S. PATENT DOCUMENTS

2006/0235689 A1* 10/2006 Sugihara et al. .............. 704/257
2011/0055228 A1* 3/2011 Tsuchida et al. .............. 707/750
2013/0246048 A1* 9/2013 Nagase et al. .................... 704/9

* cited by examiner

FIG.2

| PRE-PROOFREADING SENTENCES (NEGATIVE EXAMPLES) | POST-PROOFREADING SENTENCES (POSITIVE EXAMPLES) |
|---|---|
| ここでは、参考程度で図をあげるだけです。 | ここでは、参考程度に図だけを記載します。 |
| 手動的に監視。 | 手動で監視。 |
| ブロードキャストストームを起こした原因が以下にある。 | ブロードキャストストームを起こす原因は以下である。 |
| 簡単な画面を付いて、デバッグする時、ソースを見ながら操作できる。 | 簡単な画面が付いており、デバッグする時ソースを見ながら操作できる。 |
| 例外が処理しない。 | 例外を処理しない。 |
| 引数のエンコード転換はされていない。 | 引数がエンコード変換されていない。 |
| 第1試合は、相手が昨年の優勝校の東高校でした。 | 第1試合の相手は、昨年の優勝校の東高校でした。 |
| ローカルとリモートの流れが違いますので、注意してください。 | ローカルとリモートで流れが違いますので、注意してください。 |
| 数々の奇跡を見せてきた。 | 数々の奇跡を演じてきた。 |
| ... | ... |

FIG.7

TARGET SENTENCE:「梅雨は雨を降ります。」

- RESULTS OF MORPHOLOGICAL AND SYNTACTIC ANALYSES:

Y5 ┐ Y6 ┐
梅雨/は/雨/を/降/り/ます/。

- ANALYSIS OF CORRESPONDENCE BETWEEN NEGATIVE
  EXAMPLE AND TARGET SENTENCE:

(SEMANTIC CLASSES IN PARENTHESES)

(TARGET SENTENCE)   梅雨 (SEASON) /は/ 雨 (WEATHER) /を/ 降 /り/ます/。
(NEGATIVE EXAMPLE)  冬 (SEASON)  /は/ 雪 (WEATHER) /を/ 降 /り/ます/。
                    ̶E1                ̶E2         ̶E3

- RESULTS OF SEARCH OF CORRECTION HISTORY CORPUS:
    (1) 梅雨 (SEASON) &降 ... TWO CANDIDATES ARE RETRIEVED
    (2) 雨 (WEATHER) &降 ... TWO CANDIDATES ARE RETRIEVED

| α | 冬は雪を降ります。 | 冬には雪が降ります。 |

| β | 冬は雪を降ります。 | 冬は雪を降らせます。 |

FIG.8A $\boxed{\alpha}$

- RESULTS OF SYNTACTIC ANALYSIS ON NEGATIVE EXAMPLE:

Y7 ─┐ Y8 ─┐
冬/は/雪/を/降/り/ます/。

- ANALYSIS OF CORRESPONDENCE BETWEEN
  NEGATIVE EXAMPLE AND TARGET SENTENCE:
  (TARGET SENTENCE)   梅雨/は/雨/を/降/り/ます/。
  (NEGATIVE EXAMPLE)  冬/は/雪/を/降/り/ます/。

- ANALYSIS OF CORRESPONDENCE BETWEEN
  NEGATIVE AND POSITIVE EXAMPLES:
  (NEGATIVE EXAMPLE)  冬/は/雪/を/降/り/ます/。
  (POSITIVE EXAMPLE)  冬/には/雪/が/降/り/ます/。

FIG.8B $\boxed{\beta}$

- RESULTS OF SYNTACTIC ANALYSIS ON NEGATIVE EXAMPLE:

Y9 ─┐ Y10 ─┐
冬/は/雪/を/降/り/ます/。

- ANALYSIS OF CORRESPONDENCE BETWEEN
  NEGATIVE EXAMPLE AND TARGET SENTENCE:
  (TARGET SENTENCE)   梅雨/は/雨/を/降/り/ます/。
  (NEGATIVE EXAMPLE)  冬/は/雪/を/降/り/ます/。

- ANALYSIS OF CORRESPONDENCE BETWEEN
  NEGATIVE AND POSITIVE EXAMPLES:
  (NEGATIVE EXAMPLE)  冬/は/雪/を/降/り/ます/。
  (POSITIVE EXAMPLE)  冬/は/雪/を/降/らせ/ます/。

FIG.9A $\boxed{\alpha}$

- COMPARISON BETWEEN NEGATIVE EXAMPLE AND TARGET SENTENCE:
  (TARGET SENTENCE)　梅雨／は／雨／を／降／り／ます／。
  (NEGATIVE EXAMPLE)　冬／は／雪／を／降／り／ます／。
  (POSITIVE EXAMPLE)　冬／には／雪／が／降／り／ます／。

- CHECK FOR DIFFERENT PHRASES:
  　　(TARGET SENTENCE)　(NEGATIVE EXAMPLE)
  (1)　　　梅雨　　　⇔　　　冬
  (2)　　　雨　　　　⇔　　　雪

FIG.9B $\boxed{\beta}$

- COMPARISON BETWEEN NEGATIVE EXAMPLE AND TARGET SENTENCE:

(TARGET SENTENCE)　梅雨／は／雨／を／降／り／ます／。
(NEGATIVE EXAMPLE)　冬／は／雪／を／降／り／ます／。
(POSITIVE EXAMPLE)　冬／は／雪／を／降／らせ／ます／。

- CHECK FOR DIFFERENT PHRASES:
  　　　(TARGET SENTENCE)　(NEGATIVE EXAMPLE)
  (1)　　　　降　　　⇔　　　降

FIG.10A

- SHIFT DIFFERENT PARTS BETWEEN NEGATIVE AND
  POSITIVE EXAMPLES TO TARGET SENTENCE (NEGATIVE EXAMPLE) 冬/は/雪/を/降/り/ます/。

(TARGET SENTENCE) 梅雨/は/雨/を/降/り/ます/。

- REPLACE DIFFERENT PARTS BETWEEN TARGET SENTENCE
  AND POSITIVE EXAMPLE BY CORRESPONDING CHARACTER
  STRINGS IN POSITIVE EXAMPLE (POST-PROOFREADING TARGET SENTENCE) 梅雨/には/雨/が/降/り/ます/。

⇩ OUTPUT

- SHIFT DIFFERENT PART BETWEEN NEGATIVE AND
  POSITIVE EXAMPLES TO TARGET SENTENCE (NEGATIVE EXAMPLE) 冬/は/雪/を/降/り/ます/。

(TARGET SENTENCE) 梅雨/は/雨/を/降/り/ます/。

- REPLACE DIFFERENT PART BETWEEN TARGET SENTENCE
  AND POSITIVE EXAMPLE BY CORRESPONDING CHARACTER
  STRING IN POSITIVE EXAMPLE (POST-PROOFREADING TARGET SENTENCE) 梅雨/は/雨/を/降/らせ/ます/。

⇩ OUTPUT

| WORD | 1 | 2 | 3 | 4 | 5 | 6 | 7 | 8 | 9 |
|---|---|---|---|---|---|---|---|---|---|
| TARGET SENTENCE | パラメータ | の | 文字列 | 転換 | は | され | ていな | い | 。 |
| COMMON PART FLAG | - | 1 | - | 1 | 1 | 1 | 1 | 1 | 1 |
| COMMON PART FLAG | - | 1 (Z1) | - | 1 (Z2) | 1 (Z3) | 1 | 1 | 1 | 1 |
| NEGATIVE EXAMPLE TEXT | 引数 | の | エンコード | 転換 | は | され | ていな | い | 。 |
| DIFFERENT PART FLAG | - | 0 | - | 0 | 0 | / | / | / | / |
| DIFFERENT PART FLAG | - | 0 | - | 0 | - | - | - | - | - |
| POSITIVE EXAMPLE TEXT | 引数 | が | エンコード | 変換 | され | ていな | い | 。 | |

161

TARGET SENTENCE:「パラメータの文字列転換はされていない。」

- RESULTS OF MORPHOLOGICAL ANALYSIS:
パラメータ/の/文字列/転換/は/され/ていな/い/。

- RESULTS OF SYNTACTIC ANALYSIS:

- RESULTS OF SEARCH OF CORRECTION HISTORY CORPUS:

(1) パラメータ&文字列... NONE
(2) 文字列&転換 ... NONE
(3) 転換&され... | 引数のエンコード転換はされていない。 | 引数がエンコード変換されていない。

- RESULTS OF SYNTACTIC ANALYSIS ON NEGATIVE EXAMPLE:

Y15　Y16　Y17

引数/の/エンコード/転換/は/され/てい/ない。

- ANALYSIS OF CORRESPONDENCE BETWEEN NEGATIVE EXAMPLE AND TARGET SENTENCE:
(TARGET SENTENCE) パラメータ/の/文字列/転換/は/され/てい/ない/。
(NEGATIVE EXAMPLE) 引数/の/エンコード/転換/は/され/てい/ない/。

- ANALYSIS OF CORRESPONDENCE BETWEEN NEGATIVE AND POSITIVE EXAMPLES:
(NEGATIVE EXAMPLE) 引数のエンコード転換はされていない。
(POSITIVE EXAMPLE) 引数がエンコード変換されていない。

FIG.15

- COMPARISON BETWEEN NEGATIVE EXAMPLE AND TARGET SENTENCE:

(TARGET SENTENCE)　パラメータ/の/文字列/転換/は/され/ていな/い /。
(NEGATIVE EXAMPLE)　引数/の/エンコード/転換/は/され/ていな/い /。
(POSITIVE EXAMPLE)　引数/が/エンコード/変換/され/ていな/い /。

- CHECK FOR DIFFERENT PHRASES:

(TARGET SENTENCE)　(NEGATIVE EXAMPLE)
(1)　　　パラメータ　　⇔　　引数
(2)　　　転換　　　　　⇔　　変換

- CHECK FOR MODIFYING AND MODIFIED WORDS:

Y18

(TARGET SENTENCE)　パラメータ/の/文字列/転換/は/され/ていな/い /。
(POSITIVE EXAMPLE)　引数/が/エンコード/変換/され/ていな/い /。
　　　　　　　　　　　　　　　　Y19　Y20

- EVALUATION OF DEGREE OF SIMILARITY:

| | (POSITIVE EXAMPLE) | (TARGET SENTENCE) | | (POSITIVE EXAMPLE) | (TARGET SENTENCE) |
|---|---|---|---|---|---|
| MODIFIED WORD BY Y19 | 変換 | ⇔ 転換 | MODIFYING WORD | NONE | NONE |
| MODIFIED WORD BY Y20 | NONE | NONE | MODIFYING WORD | エンコード | ⇔ 文字列 |

FIG.16

- SHIFT DIFFERENT PARTS BETWEEN NEGATIVE AND POSITIVE EXAMPLES TO TARGET SENTENCE (NEGATIVE EXAMPLE)　引数/の/エンコード/転換/は/され/ていな/い/。

(TARGET SENTENCE)　パラメータ/の/文字列/転換/は/され/ていな/い/。

- REPLACE DIFFERENT PARTS BETWEEN TARGET SENTENCE AND POSITIVE EXAMPLE BY CORRESPONDING CHARACTER STRINGS IN POSITIVE EXAMPLE (POST-PROOFREADING TARGET SENTENCE)　パラメータ/が/文字列/変換/され/ていな/い/。

⇩ OUTPUT

パラメータが文字列変換されていない。

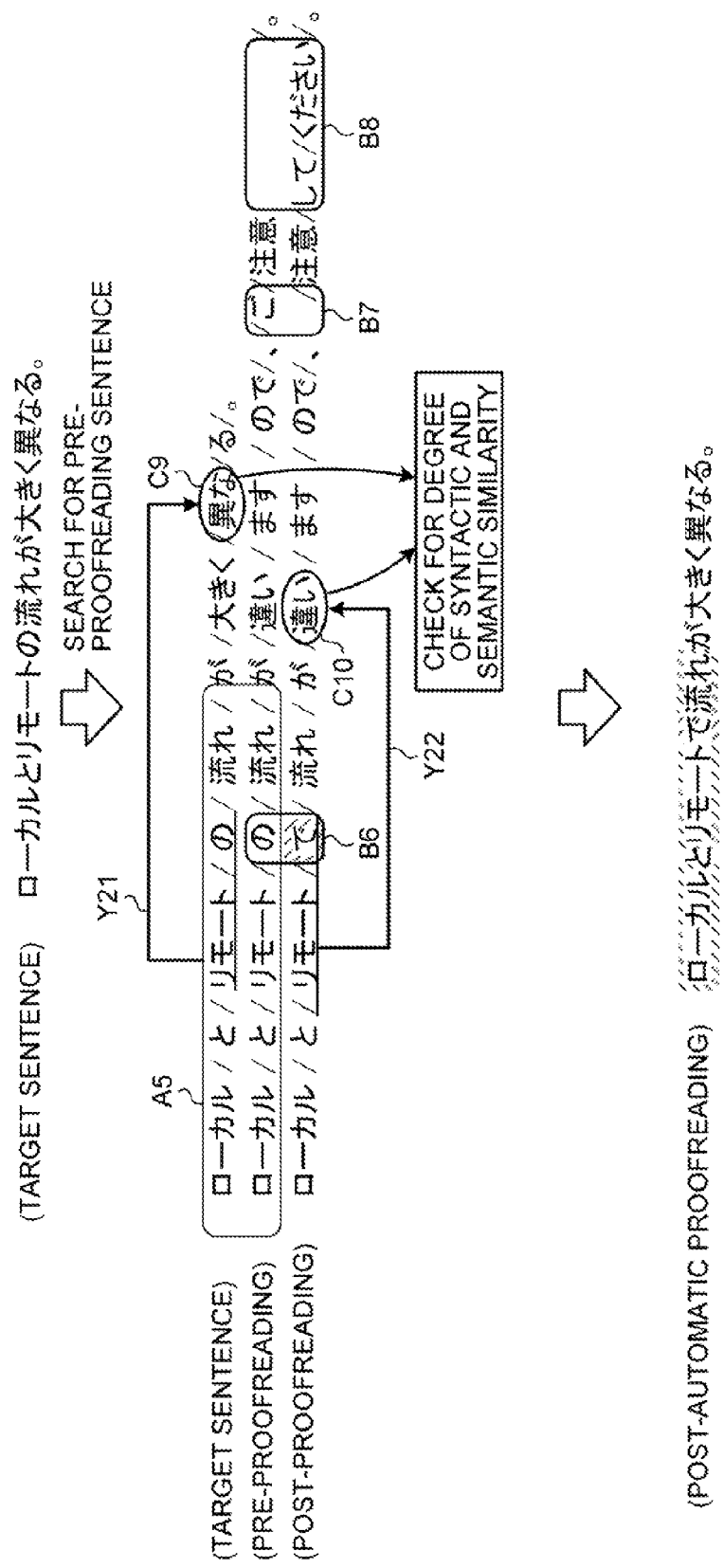

TARGET SENTENCE: 「ローカルとリモートの流れが大きく異なる。」

- RESULTS OF MORPHOLOGICAL ANALYSIS:
ローカル/と/リモート/の/流れ/が/大きく/異なる/。

- RESULTS OF SYNTACTIC ANALYSIS:

FIG.19

- RESULTS OF SEARCH OF CORRECTION HISTORY CORPUS:
  (1) ローカル&リモート...

| ローカルとリモートの流れが違いますので、注意してください。 | ローカルとリモートで流れが違いますので、注意してください。 |
|---|---|

(2) リモート&流れ... SAME SEARCH RESULTS AS THOSE IN (1)
  (3) 流れ&異なる ... NONE
  (4) 大きく&異なる ... NONE

- RESULTS OF SYNTACTIC ANALYSIS ON NEGATIVE EXAMPLE:

Y28  Y29

Y27〜 ローカル/と/リモート/の/流れ/が/違い/ます/ので/、/注意/して/ください/。

- ANALYSIS OF CORRESPONDENCE BETWEEN NEGATIVE EXAMPLE AND TARGET SENTENCE:
  (TARGET SENTENCE) ローカル/と/リモート/の/流れ/が/大きく/異なる/。
  (NEGATIVE EXAMPLE) ローカル/と/リモート/の/流れ/が/違い/ます/ので/、/注意/して/ください/。

- ANALYSIS OF CORRESPONDENCE BETWEEN NEGATIVE AND POSITIVE EXAMPLES:
  (NEGATIVE EXAMPLE) ローカル/と/リモート/の/流れ/が/違い/ます/ので/、/注意/して/ください/。
  (POSITIVE EXAMPLE) ローカル/と/リモート/で/流れ/が/違い/ます/ので/、/注意/して/ください/。

FIG.20

- COMPARISON BETWEEN NEGATIVE EXAMPLE AND TARGET SENTENCE:

(TARGET SENTENCE) ローカル/と/リモート/との/流れ/が/大きく/異なる/。
(NEGATIVE EXAMPLE) ローカル/と/リモート/と/の/流れ/が/違い/ます/ので/、/注意/して/ください/。
(POSITIVE EXAMPLE) ローカル/と/リモート/で/流れ/が/違い/ます/ので/、/注意/して/ください/。

- CHECK FOR DIFFERENT PHRASE:

(1) (TARGET SENTENCE)　(NEGATIVE EXAMPLE)
　　リモート　⇔　リモート

- CHECK FOR MODIFYING AND MODIFIED WORDS:

Y32
(TARGET SENTENCE) Y31〜ローカル/と/リモート/で/流れ/が/大きく/異な/る/。Y34
(POSITIVE EXAMPLE) Y33〜ローカル/と/リモート/で/流れ/が/違い/ます/ので/、/注意/して/ください/。

- EVALUATION OF DEGREE OF SIMILARITY:

(POSITIVE EXAMPLE) (TARGET SENTENCE)
　　違い　　⇔　　異なる

FIG.21

- SHIFT DIFFERENT PARTS BETWEEN NEGATIVE AND POSITIVE EXAMPLES TO TARGET SENTENCE (NEGATIVE EXAMPLE) ローカルとリモートの/流れ/が/違い/ます/ので、/注意/して/ください/。

(TARGET SENTENCE) ローカルとリモートの/流れ/が/大きく/異なる/。

- REPLACE DIFFERENT PARTS BETWEEN TARGET SENTENCE AND POSITIVE EXAMPLE BY CORRESPONDING CHARACTER STRINGS IN POSITIVE EXAMPLE (POST-PROOFREADING TARGET SENTENCE) ローカルとリモート/で/流れ/が/大きく/異なる/。

⇨ OUTPUT

- RESULTS OF SEARCH OF CORRECTION HISTORY CORPUS:

(1) 彼 & 見せ ... NONE
  (2) 次々 & 見せ ... NONE
  (3) 奇跡 & 見せ...

| 数々の奇跡を見せてきた。 | 数々の奇跡を演じてきた。 |

- RESULTS OF SYNTACTIC ANALYSIS ON NEGATIVE EXAMPLE:

数々の/奇跡を/見せ/てきた/。

- ANALYSIS OF CORRESPONDENCE BETWEEN NEGATIVE EXAMPLE AND TARGET SENTENCE:

(TARGET SENTENCE) 彼/は/次々/と/奇跡/を/見せ/ている/。
(NEGATIVE EXAMPLE) 数々/の/奇跡/を/見せ/てきた/。

- ANALYSIS OF CORRESPONDENCE BETWEEN NEGATIVE AND POSITIVE EXAMPLES:

(NEGATIVE EXAMPLE) 数々/の/奇跡/を/見せ/てきた/。
(POSITIVE EXAMPLE) 数々/の/奇跡/を/演じ/てきた/。

FIG.25

- COMPARISON BETWEEN NEGATIVE EXAMPLE AND TARGET SENTENCE:

(TARGET SENTENCE)　彼/は/次々/と/奇跡/を/見せ/てい/る/。
(NEGATIVE EXAMPLE)　数々/の/奇跡/を/見せ/てき/た/。
(POSITIVE EXAMPLE)　数々/の/奇跡/を/演じ/てき/た/。

- CHECK FOR DIFFERENT PHRASE:

(TARGET SENTENCE)　(NEGATIVE EXAMPLE)
(1)　　　　見せ　　　⇔　　　　見せ

- CHECK FOR MODIFYING AND MODIFIED WORDS:

Y50

(TARGET SENTENCE)　彼/は/次々/と/奇跡/を/見せ/てい/る/。

Y51

(POSITIVE EXAMPLE)　数々/の/奇跡/を/演じ/てき/た/。

- EVALUATION OF DEGREE OF SIMILARITY:
　　(POSITIVE EXAMPLE)　(TARGET SENTENCE)
　　　　奇跡　　　⇔　　　　奇跡

FIG.26

- SHIFT DIFFERENT PARTS BETWEEN NEGATIVE AND POSITIVE EXAMPLES TO TARGET SENTENCE (NEGATIVE EXAMPLE)　　数々／の／奇跡／を／見せ／てき／た／。

(TARGET SENTENCE)　　彼／は／次々／と／奇跡／を／見せ／てい／る／。

- REPLACE DIFFERENT PARTS BETWEEN TARGET SENTENCE AND POSITIVE EXAMPLE BY CORRESPONDING CHARACTER STRINGS IN POSITIVE EXAMPLE (POST-PROOFREADING TARGET SENTENCE)　　彼／は／次々／と／奇跡／を／演じ／てい／る／。

⇩ OUTPUT

彼は次々と奇跡を演じている。

TEXT PROOFREADING APPARATUS AND TEXT PROOFREADING METHOD USING POST-PROOFREADING SENTENCE WITH HIGHEST DEGREE OF SIMILARITY

CROSS-REFERENCE TO RELATED APPLICATION

This application is based upon and claims the benefit of priority of the prior Japanese Patent Application No. 2012-062759, filed on Mar. 19, 2012, the entire contents of which are incorporated herein by reference.

FIELD

The embodiment according to the invention herein is related to text proofreading apparatuses and text proofreading methods.

BACKGROUND

In recent years, along with the progress of corporate globalization and the like, non-native speakers of Japanese have had increasing opportunities of writing Japanese text. Accordingly, to provide support to such persons for writing Japanese text, there have been developed text proofreading apparatuses that detect and correct mistakes and improper expressions in created Japanese text. As a text proofreading apparatus, for example, there is commercialized a software application that performs morphological analysis on Japanese text, and based on results of the analysis, automatically proofreads improper terms in text and points out abusage of okuri-gana, conjugational ending in kana added to a Chinese character, and ending of words. In addition, there is suggested a technique for text proofreading in which unified standards for proofreading of differences in wording are defined in advance, and if it is detected that any wording in sentences does not meeting the standards, a writer is prompted to correct the wording. Further, there is a technique for text proofreading under study in which it is determined whether correct particles are used in Japanese sentences based on rules on usage of particles associated with verbs and the meanings of nouns connected to the particles, and if there is any incorrect particle, the particle is automatically corrected to the appropriate one.

Patent Document 1: Japanese Laid-open Patent Publication No. 07-085050

Patent Document 2: Japanese Laid-open Patent Publication No. 05-120275

However, the foregoing text proofreading techniques have problems as described below for example. That is, Japanese text to be proofread may include not only mistakes in okuri-gana and differences in wording that can be corrected by superficial analysis with reference to a dictionary or the like, but also mistakes such as particle errors that are difficult to correct only by superficial analysis on the sentences. For example, for correction of particles, it is a general practice to prepare in advance a dictionary including an enormous amount of organized data of constraint conditions on verbs and nouns for usage of particles. However, this method is intended to determine validity of particles associated with verbs in sentences. Therefore, if there is any error in use of a verb, it is difficult to correct the verb by this method.

Specifically, it is assumed that the Japanese sentence "冬は、雪を降ります。" is given as a target of proofreading, for example. In this case, in the proofreading method by which the verb "降ります" is not to be changed, it is possible to provide a candidate for correction of a particle such as "冬は、雪が降ります。", but it is difficult to correct two particles at the same time (correction of a compound particle error) to "冬には、雪が降ります。".

In addition, in the proofreading method by which verbs are not to be changed, it is possible to provide the candidate "冬は、雪が降ります。" but it is difficult to suggest another possible corrected phrase "冬は、雪を降らせます。". Such a problem can be solved by providing a text proofreading apparatus with a dictionary for proofreading in which pre-replacement and post-replacement character strings are registered, so as to compare the original text (sentence to be proofread) with the dictionary and automatically correct detected error(s). For example, the foregoing problem can be solved by registering data for replacing the phrase "を降ります。" with "を降らせます。" in the proofreading dictionary of the text proofreading apparatus. However, in the case of sentences such as "彼の実家は、2月に沢山の雪を降ります。", it is difficult by the foregoing method to discriminate between sentences to which the replacement with "降らせます" is applicable and sentences to which the replacement with "降らせます" is not applicable. As a result, there may arise a problem that words not to be replaced are replaced. This deteriorates accuracy of text proofreading.

Further, the foregoing constraint conditions are in general manually formulated by humans, which requires large amounts of man-hours and time to create a dictionary for proofreading. In addition, there is another problem of variations prone to occur in output from formulators. This contributes to inhibited improvement of accuracy on proofreading of text.

SUMMARY

According to an aspect of the embodiments, a text proofreading apparatus includes: a storage unit that stores pre-proofreading sentences and post-proofreading sentences in association with each other; an acquisition unit that acquires the post-proofreading sentences corresponding to the pre-proofreading sentences, according to characteristics of a proofreading target sentence from the storage unit; a selection unit that selects, from the post-proofreading sentences acquired by the acquisition unit, post-proofreading sentences with degrees of similarity between the proofreading target sentence and the post-proofreading sentences equal to or more than a predetermined threshold value; and a proofreading unit that proofreads the proofreading target sentence, using, out of the post-proofreading sentences selected by the selection unit, a post-proofreading sentence with the highest degree of similarity.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of data storage in a correction history corpus;

FIG. 7 is a diagram for describing the first half of a process performed by a proofreading candidate generation unit to generate candidates for proofreading of target example sentence 1;

FIG. 8A is a diagram for describing the second half of a process performed by the proofreading candidate generation unit to generate proofreading candidates for target example sentence 1;

FIG. 8B is a diagram for describing a process performed by the proofreading candidate generation unit to generate another proofreading candidate for target example sentence 1;

FIG. 9A is a diagram for describing a process performed by a proofreading availability determination unit to determine availability of proofreading by the proofreading candidate for target example sentence 1;

FIG. 9B is a diagram for describing a process performed by the proofreading availability determination unit to determine availability of proofreading by the other proofreading candidate for target example sentence 1;

FIG. 10A is a diagram for describing a process performed by an automatic proofreading unit to proofread target example sentence 1;

FIG. 10B is a diagram for describing a process performed by the automatic proofreading unit to correct target example sentence 1 to another sentence;

FIG. 12 is a diagram for describing a method for determining overlapping parts in the process of proofreading of target example sentence 2;

FIG. 14 is a diagram for describing the second half of a process performed by the proofreading candidate generation unit to generate proofreading candidates for target example sentence 2;

FIG. 15 is a diagram for describing a process performed by the proofreading availability determination unit to determine availability of proofreading by the proofreading candidate for target example sentence 2;

FIG. 16 is a diagram for describing a process performed by the automatic proofreading unit to proofread target example sentence 2;

FIG. 17 is a diagram for describing a process of proofreading of target example sentence 3;

FIG. 19 is a diagram for describing the second half of a process performed by the proofreading candidate generation unit to generate proofreading candidates for target example sentence 3;

FIG. 20 is a diagram for describing a process performed by the proofreading availability determination unit to determine availability of proofreading by the proofreading candidate for target example sentence 3;

FIG. 21 is a diagram for describing a process performed by the automatic proofreading unit to proofread target example sentence 3;

FIG. 24 is a diagram for describing the second half of a process performed by the proofreading candidate generation unit to generate proofreading candidates for target example sentence 4;

FIG. 25 is a diagram for describing a process performed by the proofreading availability determination unit to determine availability of proofreading by the proofreading candidate for target example sentence 4; and FIG. 26 is a diagram for describing a process performed by the automatic proofreading unit to proofread target example sentence 4.

DESCRIPTION OF EMBODIMENTS

Preferred embodiments will be explained with reference to accompanying drawings.

However, the text proofreading apparatus and the text proofreading method disclosed in the subject application are not limited by the following embodiments.

Figure 1:
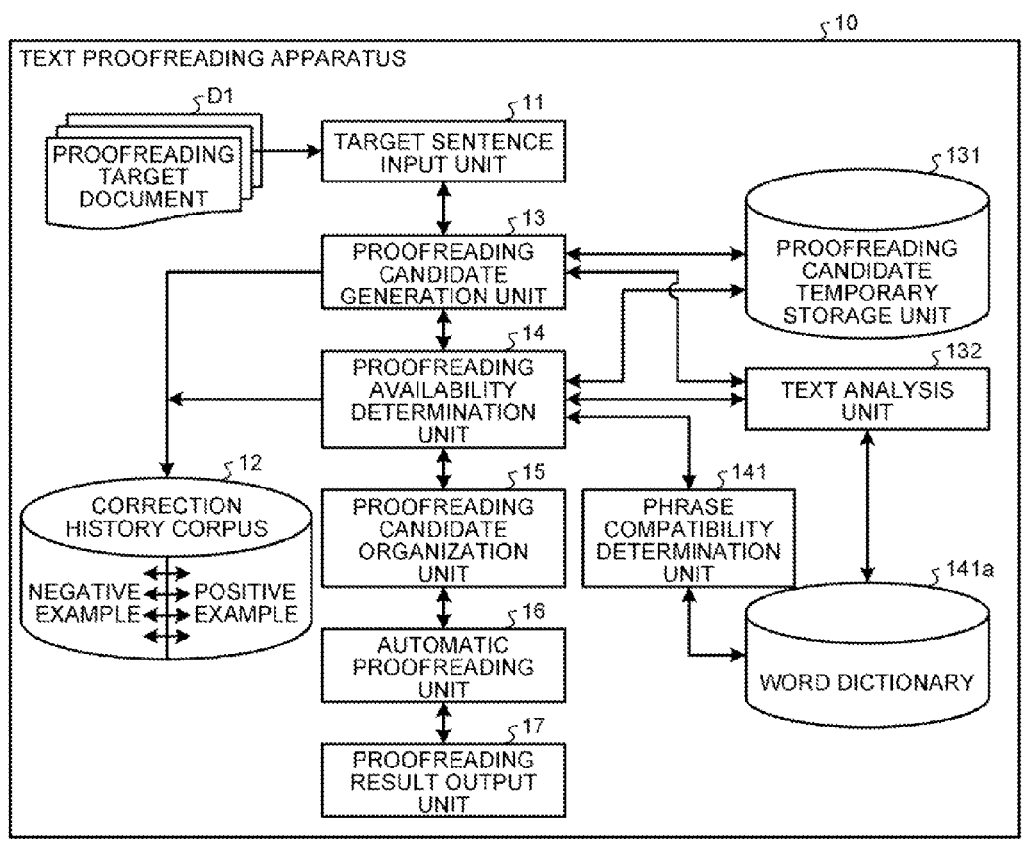
FIG. 1 is a diagram illustrating a functional configuration of a text proofreading apparatus according to the embodiment.

First, a configuration of the text proofreading apparatus according to the embodiments will be described. FIG. 1 is a diagram illustrating a functional configuration of a text proofreading apparatus 10 according to the embodiments. As illustrated in FIG. 1, the text proofreading apparatus 10 has a target sentence input unit 11; a correction history corpus 12; a proofreading candidate generation unit 13; a proofreading availability determination unit 14; a proofreading candidate organization unit 15; an automatic proofreading unit 16; and a proofreading result output unit 17. These components are connected together in a one-way or two-way direction to allow input/output of various kinds of signals and data.

The target sentence input unit 11 reads a proofreading target document D1, divides the text in the document D1 into sentences, and outputs the sentences one by one to the proofreading candidate generation unit 13 in the subsequent stage. The correction history corpus 12 is an updatable database that stores a history of correction of incorrect sentences discovered by humans during proofreading to correct sentences (correction history) sentence by sentence in pairs of pre-correction and post-correction data.

FIG. 2 is a diagram illustrating an example of data storage in the correction history corpus 12. As illustrated in FIG. 2, the correction history corpus 12 stores pre-correction sentences including errors as negative examples and post-correction sentences in which the errors are corrected as positive examples, in association with each other. Taking as an example the pre-correction sentence (negative example), "ここでは、参考程度で図をあげるだけです。", the sentence includes errors of usage of particles "で" and "だけ，" and thus the sentence "ここでは、参考程度に図だけを記載します。" is registered as a positive example. The foregoing errors are not limited to syntactic errors but may be semantic errors. For example, in the case of the negative example "第1試合は、相手が昨年の優勝校の東高校でした。", this sentence includes particle and punctuation errors, the sentence "第1試合の相手は、昨年の優勝校の 東高校でした。" is registered as a positive example.

As illustrated in FIG. 2, negative and positive examples are not necessarily associated with each other on a one-on-one basis. Specifically, if one negative example can be corrected in a plurality of manners, the negative example may be stored in association with a plurality of positive examples. Taking as an example the negative example "冬は、雪が降ります。", the text proofreading apparatus 10 may have three sentences "冬は、雪が降ります。", "冬には、雪が降ります。", and "冬は、雪を降らせます。" registered in advance as positive examples. In contrast, the correction history corpus 12 may store one positive example common to a plurality of negative examples.

The proofreading candidate generation unit 13 searches the correction history corpus 12 to create a list of candidates from the correction history possibly usable for automatic proofreading, and stores the list of candidates in an updatable proofreading candidate temporary storage unit 131. The proofreading candidate generation unit 13 causes a text analysis unit 132 to perform morphological analysis on the target sentence input from the target sentence input unit 11 and negative sentences as results of searching through the correction history corpus 12, thereby to recognize character strings in common between the target sentence and the negative examples (common character strings) word by word. The proofreading candidate generation unit 13 also causes the text analysis unit 132 to perform morphological analysis on a positive example corresponding to the negative example, thereby to recognize character strings different between the negative and positive examples (different character strings) word by word. In addition, the proofreading candidate generation unit 13 regards common parts between the common parts between the target sentence and the negative example text and the different parts between the negative example text and the positive example text, as replacement character strings, and keeps pairs of negative and positive examples including the replacement character string, as proofreading candidates, in the proofreading candidate temporary storage unit 131.

The proofreading availability determination unit 14 checks if the candidates for proofreading kept in the proofreading candidate temporary storage unit 131 can be used for proofreading of the target sentence. Specifically, the proofreading availability determination unit 14 causes the text analysis unit 132 to perform the syntactic analysis to select proofreading candidates supposed to be usable in actual proofreading of the target sentence from the proofreading candidates included in the candidate list created by the proofreading candidate generation unit 13, thereby narrowing down the candidates. In addition, the proofreading availability determination unit 14 causes a phrase compatibility determination unit 141 to perform syntactic analysis on the target sentence and the positive example to narrow down the proofreading candidates. The syntactic analysis is performed with reference to an updatable word dictionary 141a as in the foregoing morphological analysis.

Specifically, as a result of the syntactic analysis, if it is determined that the replacement character string is an independent word, the proofreading availability determination unit 14 evaluates the degree of syntactic and semantic similarity between the replacing word and the replaced word. In addition, if the replacement character string is a particle or the ending of a word, the proofreading availability determination unit 14 evaluates the degree of similarity between core words in a phrase including the replacement character string. Further, if the replacement character string is an independent word, the proofreading availability determination unit 14 evaluates the degree of similarity between words related to a phrase including the replacement character string. Based on the results of the degree of similarity between words obtained from the foregoing evaluations, the proofreading availability determination unit 14 gives evaluation scores to the replacement candidates. Then, the proofreading availability determination unit 14 excludes any replacement candidate with evaluation scores below a predetermined threshold value (candidate not usable for proofreading) from the foregoing proofreading candidates. Accordingly, only the proofreading candidates with evaluation score equal to or more than the threshold value are left in the proofreading candidate temporary storage unit 131.

The proofreading candidate organization unit 15, according to the evaluation scores for the proofreading candidates stored in the proofreading candidate temporary storage unit 131, sorts the proofreading candidates in descending order of evaluation scores. The automatic proofreading unit 16 identifies the proofreading candidate placed at the top as a result of sorting of the proofreading candidates by the proofreading candidate organization unit 15, and replaces the applicable part (character string) of the proofreading target sentence with the replacement character string of the proofreading candidate. The automatic proofreading unit 16 may replace automatically the character string with the identified proofreading candidate, but not limited to this, the automatic proofreading unit 16 may wait for an instruction from a user before replacement of the character string. The proofreading result output unit 17 suggests the sentence proofread by the proofreading candidate to the user via a display device 10d.

Figure 3:
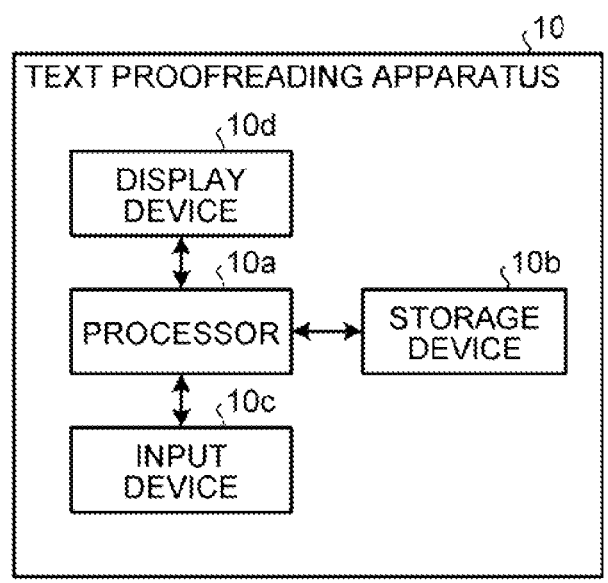
FIG. 3 is a diagram illustrating a hardware configuration of the text proofreading apparatus according to the embodiment.

Next, a hardware configuration of the text proofreading apparatus 10 will be described. FIG. 3 is a diagram illustrating a hardware configuration of the text proofreading apparatus 10. As illustrated in FIG. 3, the text proofreading apparatus 10 has a processor 10a, a storage device 10b, an input device 10c, and the display device 10d, which are connected together to allow input/output of various kinds of signals and data via a bus. The processor 10a is a central processing unit (CPU) or a digital signal processor (DSP), for example. The storage device 10b includes non-volatile storage devices such as a hard disk (HD), read-only memory (ROM), and flash memory, and RAM such as synchronous dynamic random access memory (SDRAM), for example. The input device 10c is formed by a keyboard, a mouse, and a touch panel, for example, and the display device 10d is formed by a liquid crystal display (LCD), an electro luminescence display (ELD), or a cathode ray tube (CRT), for example.

The target sentence input unit 11 of the text proofreading apparatus 10 illustrated in FIG. 1 is implemented by the input device 10c as hardware. The correction history corpus 12, the proofreading candidate temporary storage unit 131, and the word dictionary 141a are implemented by the storage device 10b as hardware. The proofreading candidate generation unit 13, the proofreading availability determination unit 14, the proofreading candidate organization unit 15, the automatic proofreading unit 16, the text analysis unit 132, and the phrase compatibility determination unit 141 are implemented by the processor 10a as hardware. The proofreading result output unit 17 is implemented by the display device 10d as hardware.

Figure 4:
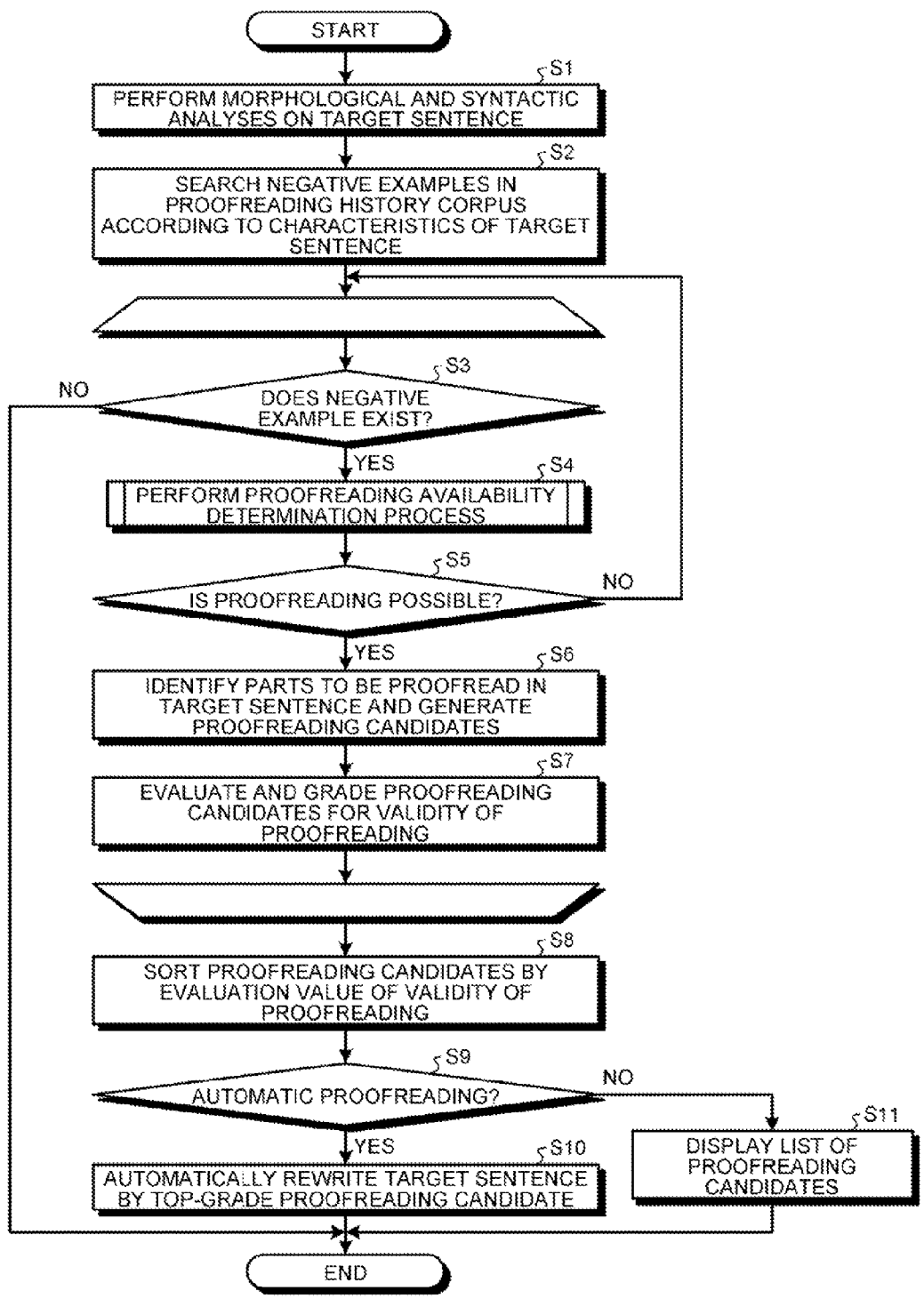
FIG. 4 is a flowchart for describing an operation of the text proofreading apparatus according to the embodiment.

Next, an operation of the text proofreading apparatus 10 will be described. FIG. 4 is a flowchart for describing an operation of the text proofreading apparatus 10 according to the example.

First at S1, upon input of a proofreading target sentence by the target sentence input unit 11, the proofreading candidate generation unit 13 performs morphological and syntactic analyses on the target sentence. As results of the morphological analysis, the proofreading candidate generation unit 13 acquires a list of morphemes constituting the target sentence and a list of separate phrases of the target sentence. In addition, as a result of the syntactic analysis, the proofreading candidate generation unit 13 acquires a conceptual structure including modified and modifying morphemes obtained as results of the morphological analysis.

At S2, the proofreading candidate generation unit 13 searches negative example text stored in the correction history corpus 12, based on the characteristics of the proofreading target sentence subjected to the text analyses (morphological analysis, syntactic analysis, and the like) at S1. Accordingly, the proofreading candidate generation unit 13 extracts positive examples corresponding to negative examples having the same characteristics as those of the target sentence input at S1 are extracted from the correction history corpus 12, and represents the extracted positive examples on a correction history list together with the corresponding negative examples. As a result of the searching, if there exists no negative example having the same characteristics as those of the target sentence in the correction history corpus 12 (S3: No), the text proofreading apparatus 10 terminates the series of steps. If there any exists (S3: Yes), the proofreading candidate generation unit 13 instructs the proofreading availability determination unit 14 to determine availability of proofreading using the negative examples.

Upon reception of the instruction for determination on availability of proofreading from the proofreading candidate generation unit 13, the proofreading availability determination unit 14 performs steps S4 to S7 described later according to the instruction. At S4, the proofreading availability determination unit 14 performs a proofreading availability determination process to select candidates usable for actual proofreading from a plurality of proofreading candidates on the correction history list, thereby narrowing down the proofreading candidates. The series of steps S3 to S7 are individually performed on all of the proofreading candidates on the correction history list, and the process is terminated when the series of steps have been completed on all of the proofreading candidates on the list.

Figure 5:
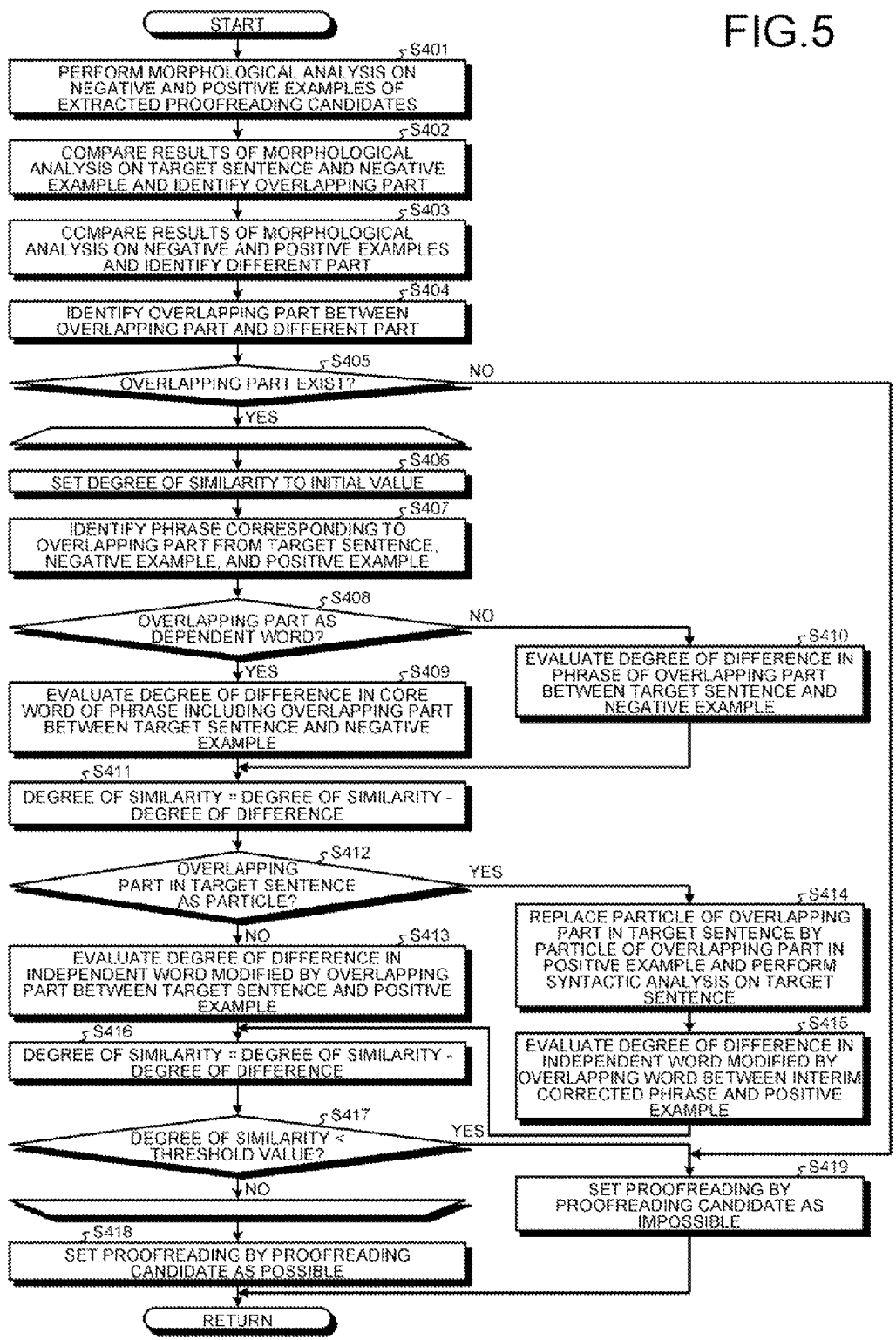
FIG. 5 is a flowchart for describing a proofreading availability determination process performed by the text proofreading apparatus.

FIG. 5 is a flowchart for describing the proofreading availability determination process performed on the text proofreading apparatus. In the proofreading availability determination process, first, the proofreading availability determination unit 14 performs morphological analysis on each of the negative and positive examples constituting the proofreading candidate data extracted from the correction history corpus 12 (S401). Next, the proofreading availability determination unit 14 compares the results of the morphological analysis on the proofreading target sentence with the results of the morphological analysis on the negative example text, thereby identifying overlapping character strings (S402). Subsequently, the proofreading availability determination unit 14 compares the results of morphological analysis on the negative example text with the results of morphological analysis on the positive example text, thereby identifying different character strings (S403). At S404, the proofreading availability determination unit 14 compares the overlapping character strings identified at S402 with the different character strings determined at S403, thereby identifying character strings in which the compared character strings overlap.

As a result of the identification at S404, if there exists no overlapping part (S405: No), the proofreading availability determination unit 14 moves to step S419 described later. If there exist any overlapping part (S405: Yes), the proofreading availability determination unit 14 performs repeatedly a series of steps S406 to S417 described later on all of the overlapping parts included in the target sentence.

Specifically, after setting the degree of similarity at an initial value (for example, 100) (S406), the proofreading availability determination unit 14 further identifies a phrase corresponding to the overlapping part identified at S404 from the target sentence, the negative example text, and the positive example text (S407). Next, the proofreading availability determination unit 14 determines whether the overlapping part is a dependent word or an independent word (S408). As a result of the determination, if the overlapping part is a dependent word (S408: Yes), the proofreading availability determination unit 14 evaluates the degree of difference in core words of a phrase including the overlapping part (overlapping part identified at S404) between the target sentence and the negative example text (S409). On the other hand, if the overlapping part is an independent word (S408: No), the proofreading availability determination unit 14 evaluates the degree of difference of phrases including the overlapping part (phrase identified at S407) between the target sentence and the negative example text (S411).

At S411, the proofreading availability determination unit 14 calculates the degree of similarity between the proofreading target sentence and the positive example text. Since the initial value for the degree of similarity is set at 100, for example, the degree of similarity here is set at a value obtained by subtracting (decreasing point) from 100 the evaluation value of degree of difference calculated at S409 or S410 (S411).

At S412, the proofreading availability determination unit 14 determines whether the word class of the overlapping part in the target sentence (hereinafter, referred to as "RPC1") is particle. As a result of the determination, if the RPC1 is not a particle (S412: No), the proofreading availability determination unit 14 evaluates the degree of difference between the independent word as a modified word of the RPC1 and the independent word as a modifying word of the overlapping part in the positive example (hereinafter, referred to as "RPC3") (S413).

In contrast, as a result of the determination at S412, if the word class of the RPC1 is particle (S412: Yes), the proofreading availability determination unit 14 replaces the particle in the RPC1 with the particle in the RPC3, and then performs syntactic analysis on the target sentence (S414). At S415, the proofreading availability determination unit 14 performs the same operation as step S413 on an interim corrected phrase (hereinafter, referred to as "RPC4") obtained by the particle replacement. Specifically, the proofreading availability determination unit 14 evaluates the degree of difference between the independent word as a modified word in the RPC4 and the independent word as a modified word in the RPC3 (S415).

Here, creation of an interim corrected phrase will be specifically described. If the phrase corresponding to the overlapping part includes a depending word, the modified word in the post-correction phrase may be different from that in the pre-correction phrase. Accordingly, when evaluating the degree of difference between the independent words as modified words in the phrases corresponding to the overlapping part, the proofreading availability determination unit 14 needs to evaluate a modified word in the corrected RPC1. Accordingly, to identify the post-correction modified word, the proofreading availability determination unit 14 corrects the depending word in the RPC1 to the depending word in the RPC3 corresponding to the overlapping part in the negative example (hereinafter, referred to as "RPC2"), thereby creating the interim corrected phrase (RPC4). Therefore, the proofreading availability determination unit 14 can analyze the target sentence including the RPC4 and identify the modified word in the RPC4. As a result, the proofreading availability determination unit 14 can evaluate the degree of difference between the independent words using the modified word in the RPC4.

At S416, the proofreading availability determination unit 14 calculates again the degree of similarity between the proofreading target sentence and the positive example text. Specifically, the proofreading availability determination unit 14 sets a new degree of similarity at a value obtained by subtracting the evaluation value of degree of difference calculated at S413 or S415 from the degree of similarity calculated at S411 (S416).

Next, the proofreading availability determination unit 14 compares the degree of similarity set at S416 with a predetermined threshold value set in advance (S417). If the degree of similarity is equal to or more than the threshold value (S417: No), it can be determined that the degree of similarity between the proofreading target sentence and the positive example text is high, and the current proofreading candidate is effective in performing the proofreading. Therefore, the proofreading availability determination unit 14 sets the proofreading as "possible" by the proofreading candidate as a determination target (S418), and then performs the step S5 illustrated in FIG. 4. On the other hand, if the degree of similarity is less than the threshold value (S417: Yes), it can be determined that the degree of similarity between the proofreading target sentence and the positive example text is low and the current proofreading candidate is not effective in performing the proofreading. Therefore, the proofreading availability determination unit 14 sets the proofreading as "not possible" by the proofreading candidate as a determination target (S419), performs the step S5 illustrated in FIG. 4. If determining at S405 that there is no overlapping part (S405: No), the proofreading availability determination unit 14 moves to the step S419 as described above.

When the proofreading availability determination has been completed on all of the overlapping parts included in the target sentence as determination targets, the proofreading availability determination unit 14 also sets the proofreading as "possible" by the proofreading candidate as a determination target. After that, the proofreading availability determination unit 14 moves to the step S5 illustrated in FIG. 4.

Returning to FIG. 4, as a result of the proofreading availability determination process at S4, if determining that the proofreading by the proofreading candidate is possible (S5: Yes), the proofreading availability determination unit 14 refers to the correction history corpus 12 to identify a part to be proofread in the target sentence and generates proofreading candidate text corresponding to the part to be proofread (S6). The proofreading availability determination unit 14 automatically evaluates the validity of proofreading using the proofreading candidate text created at S6, and sets an evaluation score (S7). If determining at S5 that the proofreading by the proofreading candidate is not possible (S5: No), the proofreading availability determination unit 14 returns to the starting point of the loop of steps S3 to S7. The text proofreading apparatus 10 performs again S3 and the subsequent steps.

When performing completely the determination of proofreading availability and the evaluation of validity of proofreading on all of the proofreading candidates on the correction history list, the proofreading availability determination unit 14 instructs the proofreading candidate organization unit 15 in the subsequent stage to sort the proofreading candidate text created at S6. According to the instruction, the proofreading candidate organization unit 15 sorts the proofreading candidate text in a descending order of validity evaluation values graded at S7 (S8).

At S9, the automatic proofreading unit 16 determines whether the current proofreading mode is for automatic proofreading or manual proofreading made by the user. In the automatic proofreading mode (S9: Yes), the automatic proofreading unit 16 rewrites automatically the target sentence by the proofreading candidate placed at the top of the proofreading candidates sorted in a descending order of evaluation values at S8 (S10). Results of the rewriting are displayed as proofreading results on the proofreading result output unit 17. On the other hand, in the manual proofreading mode (S9: No), the automatic proofreading unit 16 causes the proofreading result output unit 17 to display all the proofreading candidates sorted at S8 in a descending order of evaluation values of proofreading validity (S11), and waits for the user's selecting operation.

Subsequently, the method for evaluating the degree of difference between words and phrases (S409 and S410 illustrated in FIG. 5) will be described in more detail. The evaluation of degree of difference can be performed, for example, according to text (Txt), syntactic characteristics (Syn), semantic class (Sem), semantic relation (Rel), and combination thereof. On evaluation of degree of difference by text, the proofreading availability determination unit 14 determines the degree of similarity according to the degree of overlapping of character strings in the text. For example, the evaluation of degree of difference by text can be performed using the requested minimum number of times when operations such as insertion, deletion, and replacement are performed to edit one character string to the other character string (Levenshtein distance). On evaluation of degree of difference by syntactic characteristics, the proofreading availability determination unit 14 uses syntactic attributes contained in the word dictionary to score the degree of difference based on the total number of required cases between word classes and overlaps between the required cases. For example, when using a word dictionary for verbs, if, with respect to verb 1 and verb 2, the total number of required cases is "5" and the overlap between the required cases is "1," the degree of difference is calculated as "4 (=5−1)".

Evaluation of degree of difference by semantic class can be performed by a method using semantic attributes contained in a dictionary, a method using external data, or a method using information on clustering of positive examples, for example. In the method using semantic attributes contained in the dictionary, the proofreading availability determination unit 14 defines a depth of a thesaurus at which, when the thesaurus is traced from a root, a branch is reached, as the degree of similarity between words, and sets a value obtained by subtracting the degree of similarity from the maximum depth of the thesaurus, as an evaluation value of the degree of difference. For example, it is assumed that the thesaurus has the maximum depth of "5". If the degree of similarity between words A and B is "0," the degree of difference is calculated as "5 (=5−0)". Similarly, if the degree of similarity between words B and C is "2," the degree of difference is calculated as "3 (=5−2)". In the method using external data, the proofreading availability determination unit 14 uses an externally referable resource as a thesaurus. In the method using information on clustering of positive examples, the proofreading availability determination unit 14 uses a clustering technique to classify words in a large amount of positive example text, and sets words belonging to the same category as semantically close words.

On evaluation of degree of difference by semantic relation, the proofreading availability determination unit 14 does not evaluate words themselves but adds a modification relation between words as a target of evaluation. For example, the proofreading availability determination unit 14 uses overlaps between relation arcs, and determines the degree of difference as "0" if the labels of modification are identical, and determines the degree of difference as "5" if the labels of modification are different.

Evaluation values of degree of difference are calculated using coefficients a, b, c, and d by calculation formula (1) represented below, for example. The calculation formula (1) is generated by combining compositely the foregoing four kinds of methods for evaluating the degree of difference, but does not have to use all of the methods. The calculation formula (1) can be modified as appropriate in combination or sequence according to the accuracy and time required for proofreading.

$$\text{Evaluation value of degree of difference} = a*\text{Txt/word length} + b*\text{Syn} + c*\text{Sem} + d*\text{Rel} \qquad (1)$$

As described above, the text proofreading apparatus 10 has the initial value of degree of similarity set as 100, and when the current degree of similarity between a target sentence and a positive example sentence (=the previous degree of similarity−the evaluation value of difference) is smaller than a threshold value, the positive example sentence is excluded from the proofreading candidates.

The method for automatic proofreading on the text proofreading apparatus 10 will be described below in more detail using four target example sentences.

Target Example Sentence 1

First, referring to FIGS. 6A to 10B, an embodiment of proofreading simultaneously two particles included in the target example sentence 1 will be described. The target example sentence 1 is "梅雨は雨を降ります。". The target example sentence 1 has a composite error of a plurality of particles "は" and "を" which can be corrected in two manners.

Figure 6A:
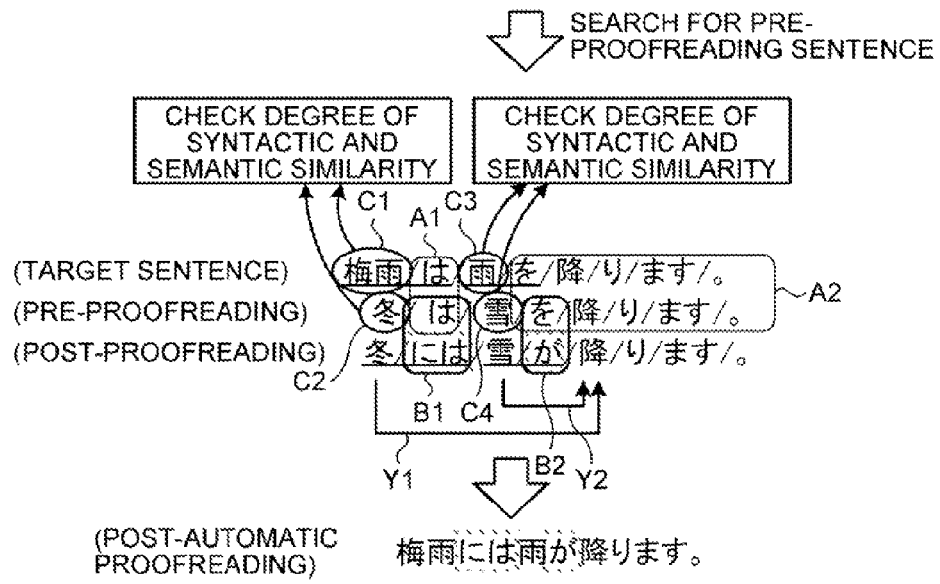
FIG. 6A is a diagram for describing a process of proofreading of target example sentence 1.

FIG. 6A is a diagram for describing a process of proofreading of the target example sentence 1. As illustrated in FIG. 6A, when the proofreading target sentence "梅雨は雨を降ります。" is given, the text proofreading apparatus 10 retrieves the pre-proofreading sentence "冬は雪を降ります。" having characteristic similar to those of the target sentence from the correction history corpus 12, and then identifies common parts A1 and A2 between the pre-proof reading sentence and the target sentence. Next, the text proofreading apparatus 10 identifies different parts B1 and B2 between the post-proofreading sentence "冬には雪が降ります。" stored in association with the pre-proofreading sentence in the correction history corpus 12 and the pre-proofreading sentence. Further, the text proofreading apparatus 10 checks the degree of syntactic and semantic similarity in independent words C1 to C4 between the target sentence and the pre-proofreading sentence. If the checked degree of similarity has reached a predetermined degree of similarity, the text proofreading apparatus 10 determines that proofreading by the pre-proofreading sentence is possible. As a result, the text proofreading apparatus 10 adopts the pre-proofreading sentence as a sentence for automatic proofreading, and outputs the post-automatic proofreading sentence "梅雨には雨が降ります。". In the post-automatic proofreading sentence, character strings with rightward-descending oblique lines ("には" and "が") represent character strings changed by the proofreading. In addition, arrows Y1 and Y2 denote that the word "降ります" is modified by character strings with under lines ("冬には" and "雪が").

Figure 6B:
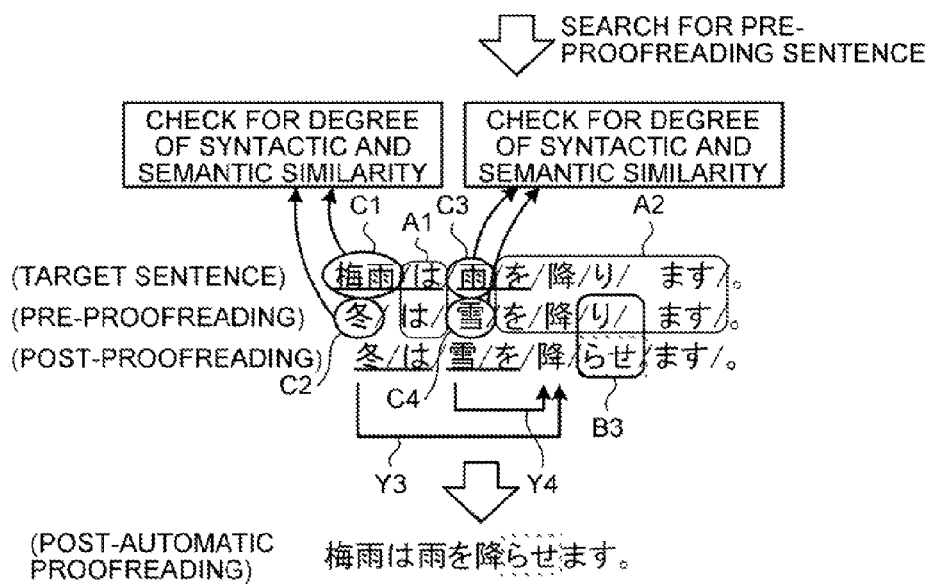
FIG. 6B is a diagram for describing a process of correcting of target example sentence 1 to another sentence.

Next, a second proofreading candidate for the target example sentence 1 will be described. FIG. 6B is a diagram for describing a process of correcting of the target example sentence 1 to another sentence. As illustrated in FIG. 6B, when the proofreading target sentence "梅雨は雨を降ります。" is given, the text proofreading apparatus 10 retrieves the pre-proofreading sentence "冬は雪を降ります。" having characteristics similar to those of the target sentence from the correction history corpus 12, and identifies common parts A1 and A2 between the pre-proofreading sentence and the target sentence. Next, the text proofreading apparatus 10 identifies the post-proofreading sentence "冬は雪を降らせます。" stored in association with the pre-proofreading sentence in the correction history corpus 12, and a different part B3 from the pre-proofreading sentence. Further, the text proofreading apparatus 10 checks the degree of syntactic and semantic similarity in the independent words C1 to C4 between the target sentence and the pre-proofreading sentence. If the checked degree of similarity has reached a predetermined degree of similarity, the text proofreading apparatus 10 determines that proofreading by the pre-proofreading sentence is possible. As a result, the text proofreading apparatus 10 adopts the pre-proofreading sentence as a sentence for automatic proofreading, and outputs the post-automatic proofreading sentence "梅雨は雨を降らせます。". In addition, in the post-automatic proofreading sentence, a character string with rightward-descending oblique lines ("らせ") represents the character string changed by the proofreading. In addition, arrows Y3 and Y4 denote that the word "降ります" is modified by character strings with under lines ("冬は" and "雪を").

Referring to FIGS. 7 to 10A, the process ranging from inputting of the target sentence to outputting of the post-automatic proofreading sentence, will be more specifically described below. FIG. 7 is a diagram for describing the first half of the process performed by the proofreading candidate generation unit 13 to generate proofreading candidates for the target example sentence 1. As illustrated in FIG. 7, the proofreading candidate generation unit 13 performs morphological analysis on the target example sentence 1 to separate the same into morphemes "梅雨／は／雨／を／降／り／ます／。". Further, the proofreading candidate generation unit 13 performs syntactic analysis on the target example sentence 1 to identify modification relations between the morphemes. Accordingly, the proofreading candidate generation unit 13 selects three morphemes having the modification relations "梅雨、降、雨" as keywords for searching the correction history corpus 12. Specifically, the proofreading candidate generation unit 13 extracts two patterns of search keywords "梅雨／は／雨／を (season) ＆降" and "雨 (weather)

&降" from the target example sentence 1. In searching of the correction history corpus 12, even if there is no match in text, searching by semantic class (the character strings in parentheses) is possible. In the case of the target example sentence 1, the semantic class of the word 梅雨／は／雨／を is season that is the same as the semantic class of the word 冬, and thus there is a match between "梅雨／は／雨／を" and "冬". The word "雨" belongs to the semantic class of weather that is the same as that of the word 雪, and there is a match between "雨" and "雪".

After performing the morphological and syntactic analyses on the target sentence, the proofreading candidate generation unit 13 uses results of the analyses to analyze correspondence between the target sentence and the negative example text, thereby to recognize common parts E1, E2, and E3 between the target sentence and the negative example text. The common parts are recognized also with consideration to semantic classes. Therefore, the words "梅雨／は／雨／を" and "冬," the words "雨" and "雪" are different in the text but are classified into the same semantic classes, and thus are recognized as common parts as with the word "雪". As one negative example text, the sentence "冬は雪を降ります。" is registered in the correction history corpus 12. Accordingly, as illustrated in FIG. 7, the proofreading candidate generation unit 13 uses the two pairs of search keywords "梅雨 (season) &降" and "雨 (weather) &降" to extract the negative example text including the both pairs of the keywords in the sentences and positive example text corresponding to the negative example text. For the target example sentence 1, two kinds of positive example text corresponding to the negative example text "冬は雪を降ります。" are registered. Accordingly, the proofreading candidate generation unit 13 reads the two kinds of positive example text α and β "冬には雪が降ります。" and "冬は雪を降らせます。" from the correction history corpus 12. In the example, two words related to one modification are used as search keywords. However, the invention is not limited to this, and the proofreading candidate generation unit 13 may set three words related to two modifications or four words related to three modifications, as search keywords.

FIG. 8A is a diagram for describing the second half of the process performed by the proofreading candidate generation unit 13 to generate proofreading candidates for the target example sentence 1. As one negative example text, the sentence "冬は雪を降ります。" is registered in the correction history corpus 12. Accordingly, as illustrated in FIG. 8A, the proofreading candidate generation unit 13 uses the two search keywords "梅雨&降" and "雨&降" to extract negative example text including both "冬" and "降" and positive example text. After performing syntactic analysis on the negative example text, the proofreading candidate generation unit 13 uses results of the analysis to analyze correspondence between the negative example text and the target sentence, thereby to recognize common parts between the target sentence and the negative example text. Further, the proofreading candidate generation unit 13 analyzes correspondence between the negative example text and the positive example text, thereby to recognize different parts between the negative example text and the positive example text.

The proofreading candidate generation unit 13 also performs the foregoing correspondence analysis on the other positive example text "冬／は／雪／を／降／らせ／ます／。". In FIGS. 8A and 8B, character strings with leftward-descending oblique lines are character strings matching the search keywords. Character strings with underlines are common character strings (common parts) between the negative example text and the target sentence, and character strings with rightward-descending oblique lines are different character strings (different parts) between the negative example text and the positive example text. If the common parts (with underlines) between the target sentence and the negative example include any of the different parts (with rightward-descending oblique lines) between the negative example and the positive example, the proofreading candidate generation unit 13 adds the character string to the history of candidates usable for replacement, and excludes character strings other than the added character string from the candidates. As a result, in the example illustrated in FIGS. 8A and 8B, of the parts with underlines, the character strings "は、を" and "り" with rightward-descending oblique lines are added as proofreading candidates.

Next, FIG. 9A is a diagram for describing a process performed by the proofreading availability determination unit 14 to determine availability of proofreading by a proofreading candidate for the target example sentence 1. As illustrated in FIG. 9A, the proofreading availability determination unit 14 first compares words between the negative example text and the target sentence. Specifically, the proofreading availability determination unit 14 identifies overlapping words between the proofread character strings (with rightward-descending oblique lines) in the negative example text and the overlapping character strings (with underlines) between the target sentence and the negative example text. In the target example sentence 1, "は" and "を" are applicable.

Next, the proofreading availability determination unit 14 checks different phrases between the target sentence and the negative example text. Specifically, if the word class of the identified word is dependent word (for example, particle, verbal auxiliary, ending of a word, or the like), the proofreading availability determination unit 14 identifies the independent word constituting the core of the phrase formed by the word. The proofreading availability determination unit 14 further identifies the word in the target sentence corresponding to the identified word in the negative example text. In the target example sentence 1, as illustrated in FIG. 9A, the proofreading availability determination unit 14 identifies the word "梅雨" as an independent word in the target sentence, and the word "冬" as an independent word in the negative example text. The proofreading availability determination unit 14 sets these words as first corresponding words. Similarly, the proofreading availability determination unit 14 identifies the word "雨" as an independent word in the target sentence, and the word "雪" as an independent word in the negative example text. The proofreading availability determination unit 14 sets these words as second corresponding words. The proofreading availability determination unit 14 evaluates the degree of similarity between the foregoing two corresponding words. In the target example sentence 1, the words "梅雨" and "冬" both belong to the semantic class of season and have a high degree of similarity therebetween. Accordingly, the proofreading availability determination unit 14 determines that automatic proofreading using the correction history data is possible. Therefore, the word "には" in the positive example text clears the checking for proofreading availability conditions. Similarly, in the target example sentence 1, the words "雨" and "雪" both belong to the semantic class of weather and have a high degree of similarity therebetween. Accordingly, the proofreading availability determination unit 14 determines that automatic proofreading using the correction history data is possible. Therefore, the word "が" in the positive example text clears the checking for proofreading availability conditions.

The proofreading availability determination unit 14 also performs the foregoing proofreading availability determination process on the other positive example text "冬／は／雪／を／降／らせ／ます／。". FIG. 9B is a diagram for describing a process performed by the proofreading availability determination unit 14 to determine availability of proofreading by the other proofreading candidate for the target example sentence 1. As illustrated in FIG. 9B, with respect to the second positive example text, the proofreading availability determination unit 14 identifies the word "降" as an independent word in the target sentence and the word "降" as an independent word in the negative example text. The proofreading availability determination unit 14 sets these words as corresponding words. The proofreading availability determination unit 14 evaluates the degree of similarity between the corresponding words. In the target example sentence 1, the words "降" and "降" are identical and have a high degree of similarity therebetween. Accordingly, the proofreading availability determination unit 14 determines that automatic proofreading using the correction history data is possible. Therefore, the word "らせ" in the positive example text clears the checking for proofreading availability conditions.

FIG. 10A is a diagram for describing a process performed by the automatic proofreading unit 16 to proofread the target example sentence 1. As illustrated in FIG. 10A, the automatic proofreading unit 16 shifts different character strings between the negative example text and the positive example text, from the negative example text to the target sentence. As a result, the target sentence has the words "は" and "を" with rightward-descending oblique lines. After that, the automatic proofreading unit 16 replaces the different character strings between the target sentence and the positive example text, with the corresponding character strings in the positive example text. Accordingly, the automatic proofreading unit 16 creates and outputs the post-proofreading sentence "梅雨には雨が 降ります。". In FIG. 10A, the character strings with rightward-descending oblique lines are different character strings (different parts) between the negative example text and the positive example text, and the character strings with leftward-descending oblique lines are character strings that match the search keywords. The character strings as different parts and matching the search keywords are given rightward-descending oblique lines on a priority basis.

The automatic proofreading unit 16 also performs the foregoing automatic proofreading process on the other positive example text "冬／は／雪／を／ 降／らせ／ます／。". FIG. 10B is a diagram for describing a process performed by the automatic proofreading unit 16 to correct the target example sentence 1 to another sentence. As illustrated in FIG. 10B, the automatic proofreading unit 16 shifts different character strings between the negative example text and the positive example text, from the negative example text to the target sentence. As a result, the target sentence has the word "り" with rightward-descending oblique lines. After that, the automatic proofreading unit 16 replaces the different character string between the negative example text and the positive example text, with the corresponding character string in the positive example text. Accordingly, the automatic proofreading unit 16 creates and outputs the post-proofreading target sentence "梅雨は雨を 降らせます。".

Target Example Sentence 2

Next, referring to FIGS. 11 to 16, an aspect of proofreading simultaneously particles and verbs included in target example sentence 2 will be described. The target example sentence 2 is "パラメータの文字列転換はされていない。". The target example sentence 2 has a composite error of the particle "の" and the verb "転換".

Figure 11:
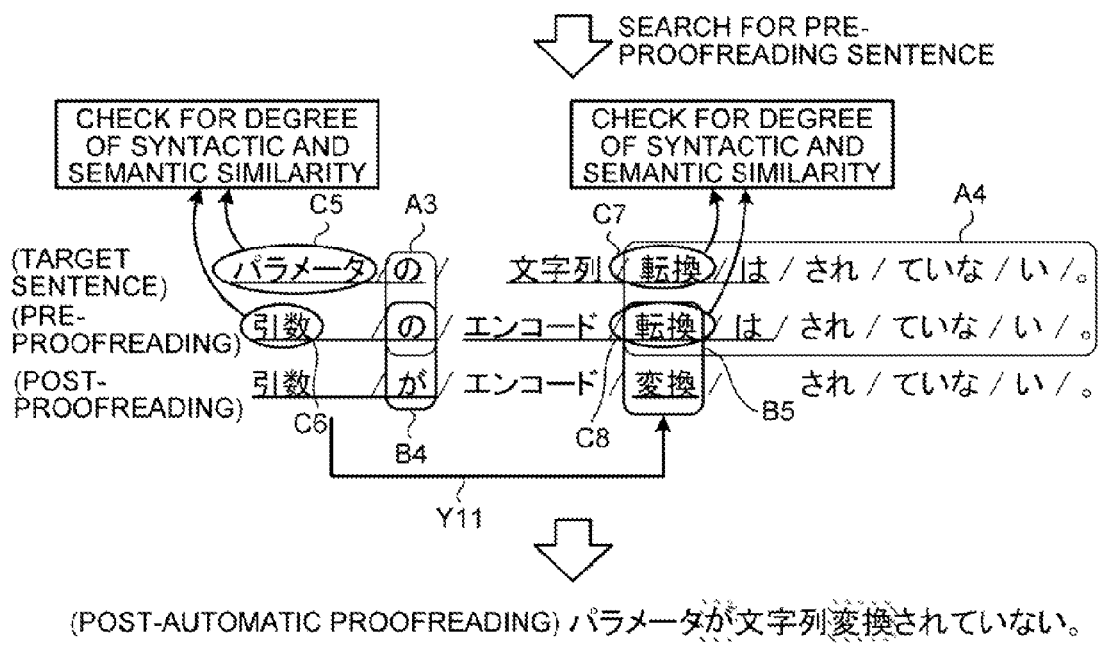
FIG. 11 is a diagram for describing a process of proofreading of target example sentence 2.

FIG. 11 is a diagram for describing a process of proofreading of the target example sentence 2. As illustrated in FIG. 11, if the proofreading target sentence "パラメータの文字列転換はされていない。" is given, the text proofreading apparatus 10 retrieves the pre-proofreading sentence "引数のエンコード転換はされていない。" having the same characteristics as those of the target sentence from the correction history corpus 12, and identifies common parts A3 and A4 between the pre-proofreading sentence and the target sentence. Next, the text proofreading apparatus 10 identifies the post-proofreading sentence "引数がエンコード変換されていない。" stored in association with the pre-proofreading sentence in the correction history corpus 12, and different parts B4 and B5 from the post-proofreading sentence and the pre-proofreading sentence. Further, the text proofreading apparatus 10 checks the degree of syntactic and semantic similarity in independent words C5 to C8 between the target sentence and the pre-proofreading sentence. If the checked degree of similarity has reached a predetermined degree of similarity, the text proofreading apparatus 10 determines that proofreading by the pre-proofreading sentence is possible. As a result, the text proofreading apparatus 10 adopts the pre-proofreading sentence as a sentence for automatic proofreading, and outputs the post-automatic proofreading sentence "パラメータが文字列変換されていない。". In the sentence after the automatic proofreading, character strings with rightward-descending oblique lines ("が" and "変換") represent character strings changed by the proofreading. In addition, arrow Y11 denotes that the word "変換" is modified by the word "引数が" with an underline.

FIG. 12 is a diagram for describing a method for identifying overlapping parts in the process of proofreading of the target example sentence 2. The text proofreading apparatus 10 causes the automatic proofreading unit 16 to proofread the target sentence with reference to an overlapping part identification table 161. As illustrated in FIG. 12, the target example sentence 2 "パラメータの文字列転換はされていない。" consists of nine words. The automatic proofreading unit 16 compares the target example sentence 2 with the negative example text "引数のエンコード転換はされていない。" word by word, and sets a common part flag "1" for each of common words "の" "転換" and "は". Next, the automatic proofreading unit 16 compares the negative example text with the positive example text "引数がエンコード変換されていない。" word by word, and sets a different part flag "0" for each of different words "の、が" "転換、変換," and "は、ー". Then, the automatic proofreading unit 16 proofreads parts Z1, Z2, and Z3 with the common part flag "1" and the different part flag "0" by replacement with the positive example text. At that time, for words with no flag (for example, 引数、エンコード), words with only the common part flag (for example, され、ていな、い、。), and words only with the different part flag, the automatic proofreading unit 16 uses the words in the target sentence (for example, パラメータ、文字列、され、ていな、い、。) as in the original text. As a result, the automatic proofreading unit 16 generates the post-automatic proofreading target sentence "パラメータが文字列変換され ていない。".

Figure 13:
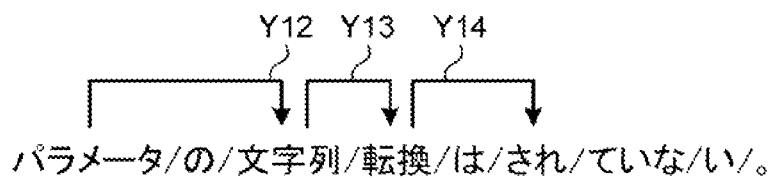
FIG. 13 is a diagram for describing the first half of a process performed by the proofreading candidate generation unit to generate proofreading candidates for target example sentence 2.

Referring to FIGS. 13 to 16, the process ranging from inputting of the target sentence to outputting of the post-automatic proofreading sentence, will be described below more specifically. FIG. 13 is a diagram for describing the first half of the process performed by the proofreading candidate generation unit 13 to generate proofreading candidates for the target example sentence 2. As illustrated in FIG. 13, the proofreading candidate generation unit 13 performs morphological analysis on the target example sentence 2 to separate the same into morphemes "パラメータ／の／文字列／転換／は／され／ていな／い／。". Further, the proofreading candidate generation unit 13 performs syntactic analysis on the target example sentence 2 to identify modification relations between the morphemes. The proofreading candidate generation unit 13 selects four morphemes having modification relations "パラメータ、文字列、転換、され" as keywords for searching the correction history corpus 12. Specifically, the proofreading candidate generation unit 13 extracts three patterns of search keywords "パラメータ＆文字列" "文字列＆転換" and "転換＆され" from the target example sentence 2. In the example, two words related to one modification are used as search keywords. However, the invention is not limited to this, and the proofreading candidate generation unit 13 may set three words related to two modifications or four words related to three modifications, as search keywords.

FIG. 14 is a diagram for describing the second half of the process performed by the proofreading candidate generation unit 13 to generate proofreading candidates for the target example sentence 2. As one negative example text, the sentence "引数のエンコード転換はされ ていない。" is registered in the correction history corpus 12. Accordingly, as illustrated in FIG. 14, the proofreading candidate generation unit 13 uses the third search keywords "転換＆され" to extract negative example text including both of the words "転換" and "され" in the sentence and corresponding positive example text. After performing syntactic analysis on the negative example text, the proofreading candidate generation unit 13 uses results of the analysis to analyze correspondence between the negative example text and the target sentence to recognize common parts between the target sentence and the negative example text. Further, the proofreading candidate generation unit 13 analyzes correspondence between the negative example text and the positive example text to recognize different parts between the negative example text and the positive example text.

In FIG. 14, the character strings with leftward-descending oblique lines are character strings matching the search keywords. In addition, the character strings with underlines are common character strings (common parts) between the negative example text and the target sentence, and the character strings with rightward-descending oblique lines are different character strings (different parts) between the negative example text and the positive example text. If the common parts (with underlines) between the target sentence and the negative example includes any of the different parts (with rightward-descending oblique lines) between the negative example and the positive example, the proofreading candidate generation unit 13 adds the applicable character string to the history of candidates usable for replacement, and excludes character strings other than the added character string from the candidates. As a result, in the example illustrated in FIG. 14, of the parts with underlines, the character strings with rightward-descending oblique lines "の、転換、は" are added to the proofreading candidates.

Next, FIG. 15 is a diagram for describing a process performed by the proofreading availability determination unit 14 to determine availability of proofreading by a proofreading candidate for the target example sentence 2. As illustrated in FIG. 15, the proofreading availability determination unit 14 first compares words between the negative example text and the target sentence. Specifically, the proofreading availability determination unit 14 identifies overlapping words between the proofread character strings (with rightward-descending oblique lines) in the negative example text and the overlapping character strings (with underlines) between the target sentence and the negative example text. In the target example sentence 2, the words "の" and "転換" are applicable.

The proofreading availability determination unit 14 then checks different phrases between the target sentence and the negative example text. Specifically, if the word class of the identified word is dependent word (for example, particle, verbal auxiliary, ending of a word, or the like), the proofreading availability determination unit 14 identifies an independent word constituting the core of the phrase formed by the identified word. The proofreading availability determination unit 14 further identifies the word in the target sentence corresponding to the identified word in the negative example text. In the target example sentence 2, as illustrated in FIG. 15, the proofreading availability determination unit 14 identifies the word "パラメータ" as an independent word in the target sentence, and the word "引数" as an independent word in the negative example text. The proofreading availability determination unit 14 sets these words as first corresponding words. In contrast, if the word class of the identified words is independent word (for example, noun, verb, or the like), the proofreading availability determination unit 14 identifies the word (independent word). The proofreading availability determination unit 14 further identifies the word in the target sentence corresponding to the identified word in the negative example text. In the target example sentence 2, as illustrated in FIG. 15, the proofreading availability determination unit 14 identifies the word "転換" as an independent word in the target sentence, and the word "変換" as an independent word in the negative example text. The proofreading availability determination unit 14 sets these words as second corresponding words. The proofreading availability determination unit 14 evaluates the degree of similarity between the foregoing two corresponding words.

Next, the proofreading availability determination unit 14 checks modifying words and modified words. Specifically, the proofreading availability determination unit 14 performs syntactic analysis on the positive example text to detect a structure of modifications between words corresponding to the identified words. The target example sentence 2 has the word "転換" modified by the word "の" (arrow Y18) as illustrated in FIG. 15. In the target example sentence 2, as illustrated in FIG. 15, the proofreading availability determination unit 14 detects a modification structure in which the word "変換" is modified by the word "引数" (arrow Y19) and also modified by the word "エンコード" (arrow Y20). The proofreading availability determination unit 14 evaluates the degree of similarity in modifying and modified words between words in the positive text corresponding to the words identified in the target sentence and the words in the target sentence. In the target example sentence 2, as illustrated in FIG. 15, the words "転換" and "転換" modified as depicted by arrow Y19 have a high degree of similarity therebetween, and thus the proofreading availability determination unit 14 determines that automatic proofreading using the correction history data is possible. Therefore, the word "変換" modified as depicted by arrow Y19 in the positive example text clears the checking for proofreading availability conditions. Similarly, the words "エンコード" and "文字列" modified as depicted by arrow Y20 have a high degree of similarity therebetween, and thus the proofreading availability determination unit 14 determines that automatic proofreading using the correction history data is possible. Therefore, the word "エンコード" modified as depicted by arrow Y20 in the positive example text also clears the checking for proofreading availability conditions.

FIG. 16 is a diagram for describing a process performed by the automatic proofreading unit 16 to proofread the target example sentence 2. As illustrated in FIG. 16, the automatic proofreading unit 16 shifts different character strings between the negative example text and the positive example text, from the negative example text to the target sentence. As a result, the target sentence has the words "の" "転換" and "は" with rightward-descending oblique lines. After that, the automatic proofreading unit 16 replaces the different character strings between the target sentence and the positive example text, by corresponding character strings in the positive example text. Accordingly, the automatic proofreading unit 16 generates and outputs the post-proofreading target sentence "パラメータが文字列変換されていない。". In FIG. 16, the character strings with rightward-descending oblique lines are different character strings (different parts) between the negative example text and the positive example text, and the character strings with leftward-descending oblique lines are character strings matching the search keywords. The character strings constituting the different parts and matching the search keywords are given rightward-descending oblique lines on a priority basis.

Target Example Sentence 3

Next, referring to FIGS. 17 to 21, an embodiment in which an adnominal modification particle is corrected to a continuous modification particle will be described.

FIG. 17 is a diagram for describing a process of proofreading of target example sentence 3. As illustrated in FIG. 17, if the proofreading target sentence "ローカルとリモートの流れが大きく異なる。" is given, the text proofreading apparatus 10 retrieves the pre-proofreading sentence "ローカルとリモートの流れが違いますので、ご注意。" having the same characteristics as those of the target sentence from the correction history corpus 12, and then identifies a common part A5 between the pre-proofreading sentence and the target sentence. Next, the text proofreading apparatus 10 identifies the post-proofreading sentence "ローカルとリモートで流れが違いますので、注意してください。" stored in the correction history corpus 12 in association with the pre-proofreading sentence, and different parts B6 to B8 between the post-proofreading sentence and the pre-proofreading sentence. Further, the text proofreading apparatus 10 checks the degree of syntactic and semantic similarity in independent words C9 and C10 between the target sentence and the post-proofreading sentence. If the checked degree of similarity has reached a predetermined degree of similarity, the text proofreading apparatus 10 determines that proofreading by the post-proofreading sentence is possible. As a result, the text proofreading apparatus 10 adopts the post-proofreading sentence as a sentence for automatic proofreading, and then outputs the post-automatic proofreading sentence "ローカルとリモートの流れが大きく異なる。". In the post-automatic proofreading sentence, the character string "で" with rightward-descending oblique lines represents a character string changed by the proofreading.

Figure 18:
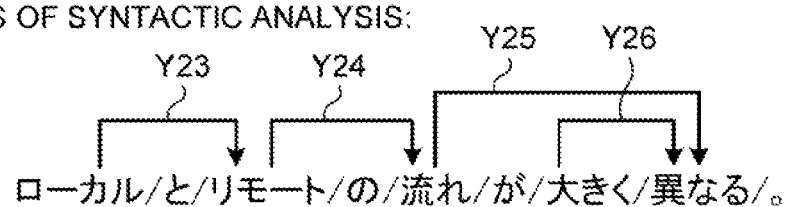
FIG. 18 is a diagram for describing the first half of a process performed by the proofreading candidate generation unit to generate proofreading candidates for target example sentence 3.

Referring to FIGS. 18 to 21, a process ranging from inputting of the target sentence to outputting of the post-automatic proofreading sentence will be described below more specifically. FIG. 18 is a diagram for describing the first half of the process performed by the proofreading candidate generation unit 13 to generate proofreading candidates for the target example sentence 3. As illustrated in FIG. 18, the proofreading candidate generation unit 13 performs morphological analysis on the target example sentence 3 to separate the same into morphemes "ローカル／と／リモート／の／流れ／が／大きく／異なる／。". As a result of the syntactic analysis, the proofreading candidate generation unit 13 identifies modification relations between the morphemes in the target example sentence 3. The proofreading candidate generation unit 13 selects five morphemes "ローカル、リモート、流れ、大きく、異なる" having the modification relations as keywords for searching the correction history corpus 12. Specifically, the proofreading candidate generation unit 13 extracts four patterns of search keywords "ローカル＆リモート" "リモート＆流れ" "流れ＆異なる" and "大きく＆異なる" from the target example sentence 3. In the example, the proofreading candidate generation unit 13 sets two words related to one modification as search keywords. However, the invention is not limited to this, and the proofreading candidate generation unit 13 may set three words related to two modifications or four words related to three modifications, as search keywords.

FIG. 19 is a diagram for describing the second half of the process performed by the proofreading candidate generation unit 13 to generate proofreading candidates for the target example sentence 3. As one negative example text, the sentence "ローカルとリモートの流れが違いますので、注意してください。" is registered in the correction history corpus 12. Accordingly, as illustrated in FIG. 19, the proofreading candidate generation unit 13 uses the first search keywords "ローカル＆リモート" to extract negative example text including both the words "ローカル" and "リモート" in the sentence and corresponding positive example text. After performing syntactic analysis on the negative example text, the proofreading candidate generation unit 13 uses results of the analysis to analyze correspondence between the negative example text and the target sentence, thereby to recognize common parts between the target sentence and the negative example text. The proofreading candidate generation unit 13 further analyzes correspondence between the negative example text and the target sentence to recognize different parts between the negative example text and the positive example text. In addition, the second search keywords "リモート&流れ" are also included in the negative example text, and thus the same search results as the foregoing (negative and positive examples) can be obtained. Accordingly, the subsequent analysis process is omitted to avoid overlapping.

In FIG. 19, the character strings with leftward-descending oblique lines are character strings matching the search keywords. In addition, the character strings with underlines are common character strings (common parts) between the negative example text and the target sentence, and the character strings with rightward-descending oblique lines are different character strings (different parts) between the negative example text and the positive example text. If the common parts between the target sentence and the positive example (with underlines) include the different parts between the negative example and positive example (with rightward-descending oblique lines), the proofreading candidate generation unit 13 adds the applicable character string to the candidates usable for replacement in the history, and excludes character strings other than the added character string from the candidates. As a result, in the example illustrated in FIG. 19, the proofreading candidate generation unit 13 adds, of the parts with underlines, the character string "の" with rightward-descending oblique lines to the proofreading candidates.

Next, FIG. 20 is a diagram for describing a process performed by the proofreading availability determination unit 14 to determine availability of proofreading by the proofreading candidate for the target example sentence 3. As illustrated in FIG. 20, the proofreading availability determination unit 14 first compares words between the negative example text and the target sentence. Specifically, the proofreading availability determination unit 14 identifies an overlapping word between the proofread character strings (with rightward-descending oblique lines) in the negative example text and the overlapping character strings (with underlines) between the target sentence and the negative example text. In the target example sentence 3, the word "の" is applicable.

The proofreading availability determination unit 14 then checks different phrases between the target sentence and the negative example text. Specifically, if the word class of the identified word is dependent word (for example, particle, verbal auxiliary, ending of a word, or the like), the proofreading availability determination unit 14 identifies an independent word constituting the core of the phrase formed by the identified word. The proofreading availability determination unit 14 further identifies the word in the target sentence corresponding to the identified word in the negative example text. In the target example sentence 3, as illustrated in FIG. 20, the proofreading availability determination unit 14 identifies, for the positive example text, the word "リモート" as an independent word in the target sentence, and the word "リモート" as an independent word in the negative example text. The proofreading availability determination unit 14 sets these words as corresponding words. The proofreading availability determination unit 14 evaluates the degree of similarity between the corresponding words. In the target example sentence 3, the words "リモート" and "リモート" are identical and have a high degree of similarity therebetween. Accordingly, the proofreading availability determination unit 14 determines that automatic proofreading using the correction history data is possible. Therefore, the word "リモート" in the positive example text clears the checking for proofreading availability conditions.

Next, the proofreading availability determination unit 14 checks modifying words and modified words. Specifically, the proofreading availability determination unit 14 performs syntactic analysis on the positive example text to detect a structure of modifications between words corresponding to the identified words. On the syntactic analysis, the target sentence has a particle replaced by a particle "で" in the positive example text. The proofreading availability determination unit 14 evaluates the degree of similarity in modifying and modified words between a word in the positive text corresponding to the word identified in the target sentence and the word in the target example sentence. In the target example sentence 3, the word "違い" in the positive example text and the word "異なる" in the target sentence are subjected to the evaluation of degree of similarity. These words belong to the same semantic class and are similar in case constraint conditions, and thus are determined as correctable. Therefore, these words clear the checking for proofreading availability conditions.

FIG. 21 is a diagram for describing a process performed by the automatic proofreading unit 16 to proofread the target example sentence 3. As illustrated in FIG. 21, the automatic proofreading unit 16 shifts a different character string between the negative example text and the positive example text, from the negative example text to the target sentence. As a result, the target sentence has the word "の" with rightward-descending oblique lines. After that, the automatic proofreading unit 16 replaces the different character strings between the target sentence and the positive example text, by corresponding character strings in the positive example text. Accordingly, the automatic proofreading unit 16 generates and outputs the post-proofreading target sentence "ローカルとリモートの流れが大きく異なる。". In FIG. 21, the character strings with rightward-descending oblique lines are different character strings (different parts) between the negative example text and the positive example text, and the character strings with leftward-descending oblique lines are character strings matching the search keywords. The character strings constituting the different parts and matching the search keywords are given rightward-descending oblique lines on a priority basis.

Target Example Sentence 4

Next, referring to FIGS. 22 to 26, an embodiment for proofreading of verbal expressions will be described below.

Figure 22:
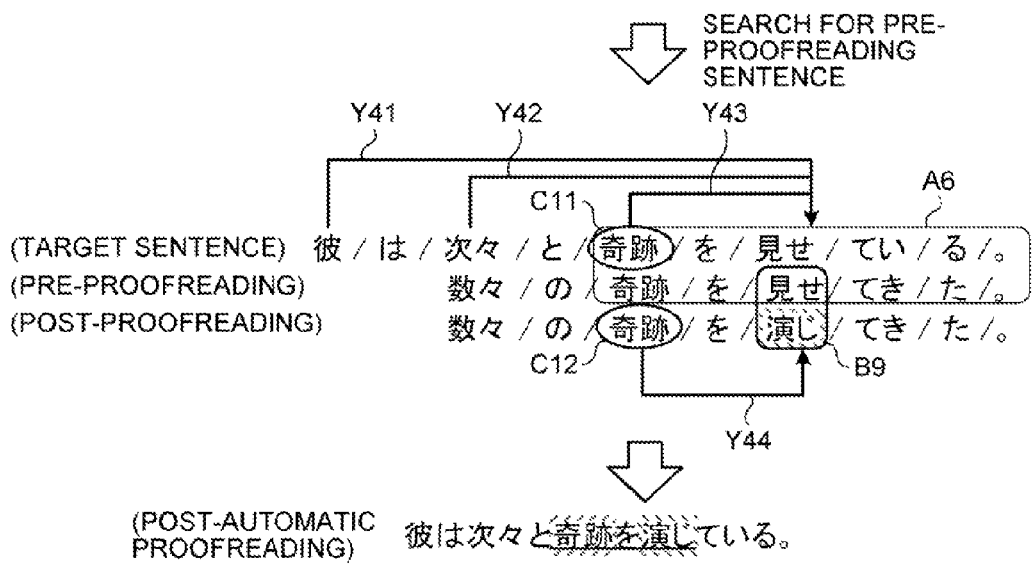
FIG. 22 is a diagram for describing a process of proofreading of target example sentence 4.

FIG. 22 is a diagram for describing a process of proofreading of target example sentence 4. As illustrated in FIG. 22, if the proofreading target sentence "彼は次々と奇跡を見せている。" is given, the text proofreading apparatus 10 retrieves the pre-proofreading sentence "数々の奇跡を見せてきた。" having the same characteristics as those of the target sentence from the correction history corpus 12, and then identifies a common part A6 between the pre-proofreading sentence and the target sentence. Next, the text proofreading apparatus 10 identifies the post-proofreading sentence "数々の奇跡を演じてきた。" stored in the correction history corpus 12 in association with the pre-proofreading sentence, and a different part B9 between the post-proofreading sentence and the pre-proofreading sentence. Further, the text proofreading apparatus 10 checks the degree of syntactic and semantic similarity in independent words C11 and C12 between the target sentence and the post-proofreading sentence. If the checked degree of similarity has reached a predetermined degree of similarity, the text proofreading apparatus 10 determines that proofreading by the post-proofreading sentence is possible. As a result, the text proofreading apparatus 10 adopts the post-proofreading sentence as a sentence for automatic proofreading, and then outputs the post-automatic proofreading sentence "彼は次々と奇跡を演じている。". In the post-automatic proofreading sentence, the character string "演じ" with rightward-descending oblique lines represents a character string changed by the proofreading.

Figure 23:
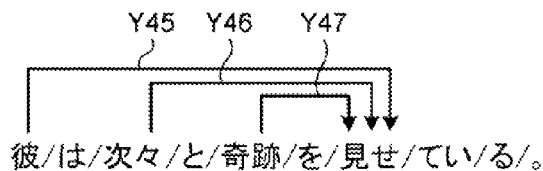
FIG. 23 is a diagram for describing the first half of a process performed by the proofreading candidate generation unit to generate proofreading candidates for target example sentence 4.

Referring to FIGS. 23 to 26, a process ranging from inputting of the target sentence to outputting of the post-automatic proofreading sentence will be described below more specifically. FIG. 23 is a diagram for describing the first half of the process performed by the proofreading candidate generation unit 13 to generate proofreading candidates for the target example sentence 4. As illustrated in FIG. 23, the proofreading candidate generation unit 13 performs morphological analysis on the target example sentence 4 to separate the same into morphemes "彼／は／次々／と／奇跡／を／見せ／てい／る／。". As a result of the syntactic analysis, the proofreading candidate generation unit 13 identifies modification relations between the morphemes in the target example sentence 4. The proofreading candidate generation unit 13 selects four morphemes "彼、見せ、次々、奇跡" having the modification relations as keywords for searching the correction history corpus 12. Specifically, the proofreading candidate generation unit 13 extracts three patterns of search keywords "彼&見せ" "次々&見せ" and "奇跡&見せ" from the target example sentence 4. In the example, the proofreading candidate generation unit 13 sets two words related to one modification as search keywords. However, the invention is not limited to this, and the proofreading candidate generation unit 13 may set three words related to two modifications or four words related to three modifications, as search keywords.

FIG. 24 is a diagram for describing the second half of the process performed by the proofreading candidate generation unit 13 to generate proofreading candidates for the target example sentence 4. As one negative example text, the sentence "数々の奇跡を見せてきた。" is registered in the correction history corpus 12. Accordingly, as illustrated in FIG. 24, the proofreading candidate generation unit 13 uses the third search keywords "奇跡&見せ" to extract negative example text including both the words "奇跡" and "見せ" in the sentence and corresponding positive example text. After performing syntactic analysis on the negative example text, the proofreading candidate generation unit 13 uses results of the analysis to analyze correspondence between the negative example text and the target sentence, thereby to recognize common parts between the target sentence and the negative example text. The proofreading candidate generation unit 13 further analyzes correspondence between the negative example text and the target sentence to recognize different parts between the negative example text and the positive example text.

In FIG. 24, the character strings with leftward-descending oblique lines are character strings matching the search keywords. In addition, the character strings with underlines are common character strings (common parts) between the negative example text and the target sentence, and the character strings with rightward-descending oblique lines are different character strings (different parts) between the negative example text and the positive example text. If the common parts between the target sentence and the positive example (with underlines) include the different parts between the negative example and positive example (with rightward-descending oblique lines), the proofreading candidate generation unit 13 adds the applicable character string to the candidates usable for replacement in the history, and excludes character strings other than the added character string from the candidates. As a result, in the example illustrated in FIG. 24, the proofreading candidate generation unit 13 adds, of the parts with underlines, the character string "見せ" with rightward-descending oblique lines to the proofreading candidates.

Next, FIG. 25 is a diagram for describing a process performed by the proofreading availability determination unit 14 to determine availability of proofreading by the proofreading candidate for the target example sentence 3. As illustrated in FIG. 25, the proofreading availability determination unit 14 first compares words between the negative example text and the target sentence. Specifically, the proofreading availability determination unit 14 identifies an overlapping word between the proofread character strings (with rightward-descending oblique lines) in the negative example text and the overlapping character strings (with underlines) between the target sentence and the negative example text. In the target example sentence 4, the word "見せ" is applicable.

The proofreading availability determination unit 14 then checks different phrases between the target sentence and the negative example text. Specifically, if the word class of the identified word is dependent word (for example, particle, verbal auxiliary, ending of a word, or the like), the proofreading availability determination unit 14 identifies an independent word constituting the core of the phrase formed by the identified word. The proofreading availability determination unit 14 further identifies the word in the target sentence corresponding to the identified word in the negative example text. In the target example sentence 4, as illustrated in FIG. 25, the proofreading availability determination unit 14 identifies, for the positive example text, the word "見せ" as an independent word in the target sentence, and the word "見せ" as an independent word in the negative example text. The proofreading availability determination unit 14 sets these words as corresponding words. The proofreading availability determination unit 14 evaluates the degree of similarity between the corresponding words. In the target example sentence 4, the words "見せ" and "見せ" are identical and have a high degree of similarity therebetween. Accordingly, the proofreading availability determination unit 14 determines that automatic proofreading using the correction history data is possible. Therefore, the word "演じ" in the positive example text clears the checking for proofreading availability conditions.

Next, the proofreading availability determination unit 14 checks modifying words and modified words. Specifically, the proofreading availability determination unit 14 performs syntactic analysis on the positive example text to detect a structure of modifications between words corresponding to the identified words. The proofreading availability determination unit 14 evaluates the degree of similarity in modifying and modified words between a word in the positive text corresponding to the word identified in the target sentence and the word in the target example sentence. In the target example sentence 4, the word "奇跡" in the positive example text and the word "奇跡" in the target sentence are subjected to the evaluation of degree of similarity. These words are identical and thus have a high degree of similarity therebetween. Therefore, these words clear the checking for proofreading availability conditions.

FIG. 26 is a diagram for describing a process performed by the automatic proofreading unit 16 to proofread the target example sentence 4. As illustrated in FIG. 26, the automatic proofreading unit 16 shifts a different character string between the negative example text and the positive example text, from the negative example text to the target sentence. As a result, the target sentence has the word "見せ" with rightward-descending oblique lines. After that, the automatic proofreading unit 16 replaces the different character strings between the target sentence and the positive example text, by corresponding character strings in the positive example text. Accordingly, the automatic proofreading unit 16 generates and outputs the post-proofreading target sentence "彼は次々と奇跡を演じている。". In FIG. 26, the character strings with rightward-descending oblique lines are different character strings (different parts) between the negative example text and the positive example text, and the character strings with leftward-descending oblique lines are character strings matching the search keywords. The character strings constituting the different parts and matching the search keywords are given rightward-descending oblique lines on a priority basis.

As described above, the text proofreading apparatus 10 has the correction history corpus 12, the proofreading candidate generation unit 13, the proofreading availability determination unit 14, and the automatic proofreading unit 16. The correction history corpus 12 stores pre-proofreading sentences (negative sentences) and post-proofreading sentences (positive sentences) in association with each other. The proofreading candidate generation unit 13 acquires the post-proofreading sentences corresponding to the pre-proofreading sentences from the correction history corpus 12, according to characteristics of a proofreading target sentence. The proofreading availability determination unit 14 selects, from the post-proofreading sentences acquired by the proofreading candidate generation unit 13, post-proofreading sentences with degrees of similarity between the proofreading target sentences and the post-proofreading sentences equal to or more than a predetermined threshold value, as proofreading candidates. The automatic proofreading unit 16 proofreads the proofreading target sentence, using, out of the post-proofreading sentences selected by the proofreading availability determination unit 14, a post-proofreading sentence with the highest degree of similarity.

As described above, the text proofreading apparatus 10 searches the correction history corpus 12 holding example sentences including errors (negative examples) and example sentences with the errors corrected (positive examples) in association with each other, thereby allowing automatic correction of various phrases such as particles, ending of verbs, and independent words, with reference to the past correction history. Specifically, the text proofreading apparatus 10 recognizes the common character strings and the different character strings, based on results of search of the correction history corpus 12, and regards common parts (overlapping parts) between the two kinds of character strings as parts required for proofreading. At that time, the text proofreading apparatus 10 performs morphologic analysis and syntactic analysis on the target sentence and the positive example, and evaluates the degree of syntactic and semantic similarity between modified and modifying words. Accordingly, the text proofreading apparatus 10 determines availability of proofreading of the target sentence.

The text proofreading apparatus 10 has the correction history corpus 12 as a sentence pair database in which pre-correction and post-correction sentences manually prepared by humans are accumulated, and uses the correction history corpus 12 to perform automatic proofreading of sentences. Therefore, it is possible to detect a plurality of particle errors (composite errors) simultaneously and correct the same to correct expressions, without the need to prepare in advance a dictionary for proofreading, unlike in the conventional situations. This makes it possible to proofread sentences with high accuracy by the simple configuration.

In addition, in the text proofreading apparatus 10, the automatic proofreading unit 16 replaces character strings of overlapping parts in the pre-proofreading sentence between character strings in common (common character strings) between the proofreading target sentence and the pre-proofreading sentence and character strings different (different character strings) between the pre-proofreading sentence and the post-proofreading sentence overlap, by character strings in the post-proofreading sentence corresponding to the applicable character strings. Accordingly, the automatic proofreading unit 16 proofreads the proofreading target sentence.

If the overlapping parts between the common character strings and the different character strings correspond to the proofreading target sentence but are different from the post-proofreading sentence (positive example), it is conceivable that the overlapping parts are incorrect character strings (character strings requiring correction). On the other hand, if character strings are included in the pre-proofreading sentence (negative example) but do not constitute the overlapping parts, it is conceivable that the character strings are character strings usable as they are from the original sentence (target sentence) (character strings not requiring correction). Therefore, the automatic proofreading unit 16 replaces only the overlapping character strings between the common character strings and the different character strings according to the post-proofreading sentence (positive example), thereby to achieve efficient sentence proofreading without excess or deficiency. As a result, the text proofreading apparatus 10 has reduced processing load thereon and is improved in proofreading processing speed.

Further, in the text proofreading apparatus 10, the proofreading availability determination unit 14 may determine availability of proofreading by the post-proofreading sentence, based on the degree of syntactic or semantic similarity between the proofreading target sentence and the post-proofreading sentence. In other words, the proofreading availability determination unit 14 evaluates the foregoing degree of similarity to thereby select the positive example sentence as a proofreading candidate by the automatic proofreading unit 16, not only if the target sentence and the positive example sentence are syntactically similar to each other but also if the target sentence and the positive example sentence are semantically similar to each other. Specifically, if the degree of similarity between the target sentence and the positive example sentence is low, the proofreading availability determination unit 14 determines that proofreading using the positive example sentence is not possible, and if the degree of similarity between the target sentence and the positive example sentence is high, the proofreading availability determination unit 14 determines that proofreading using the positive example sentence is possible. Accordingly, positive example sentences not similar to the target sentence, are not excluded from the proofreading candidates. Therefore, it is possible to prevent that the target sentence is proofread using the positive example sentence not similar to the target sentence. This results in reduction of incorrect proofreading and improvement in proofreading accuracy.

With regard to use applications of the text proofreading apparatus 10, the text proofreading apparatus 10 can be used for improvement in quality of Japanese sentences written by non-native Japanese speakers or the like and enhancement in efficiency of proofreading Japanese sentences written by non-native Japanese speakers or the like, for example. Besides, the text proofreading apparatus 10 can be used to promote learning of Japanese by non-Japanese workers at overseas locations of Japanese corporations and the like.

In addition, after determining availability of use of proofreading candidates listed at S2, the text proofreading apparatus 10 evaluates the validity of proofreading (refer to FIG. 4). However, the invention is not limited to this embodiment, and the text proofreading apparatus 10 first may evaluate the listed proofreading candidates for the validity of proofreading, and then determine availability of proofreading by the proofreading candidate determined as valid. In addition, the text proofreading apparatus 10 does not have to perform the step of sorting the proofreading candidates according to the values of validity evaluation (S8 illustrated in FIG. 4), but may pick up only a proofreading candidate with the highest value of validity evaluation and suggest the same to the user.

The constituent elements of the text proofreading apparatus 10 do not need to be configured physically as illustrated in the drawings. Specifically, the specific embodiments of distribution and integration of the devices are not limited to those illustrated in the drawings, and all or some of the devices may be distributed or integrated functionally or physically in an arbitrary unit, according to various loads, use conditions, and the like. For example, the proofreading candidate temporary storage unit 131 and the text analysis unit 132 are described and illustrated as components separate from the proofreading candidate generation unit 13 and the proofreading availability determination unit 14. However, the proofreading candidate temporary storage unit 131 and the text analysis unit 132 may be included in these components. Similarity, the phrase compatibility determination unit 141 and the word dictionary 141a may be included in the proofreading availability determination unit 14. In addition, the proofreading availability determination unit 14 and the proofreading candidate organization unit 15 or the proofreading candidate generation unit 13 and the correction history corpus 12 may be integrated into one constituent element.

In contrast, the proofreading availability determination unit 14 may be distributed to a part determining availability of proofreading candidates and a part evaluating (grading) validity of individual proofreading candidates determined as usable. Similarity, the text analysis unit 132 may be divided into a part performing syntactic analysis and a part performing morphological analysis. Further, the storage device 10b may be connected as an external device of the text proofreading apparatus 10 via a network or a cable.

According to one embodiment of the text proofreading apparatus disclosed in the subject application, it is possible to proofread sentences in an accurate and easy manner.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A text proofreading apparatus comprising:
   a storage unit that stores pre-proofreading sentences and post-proofreading sentences in association with each other;
   an acquisition unit that acquires the post-proofreading sentences corresponding to the pre-proofreading sentences, according to characteristics of a proofreading target sentence from the storage unit;
   a selection unit that selects, from the post-proofreading sentences acquired by the acquisition unit, post-proofreading sentences with degrees of similarity between the proofreading target sentence and the post-proofreading sentences equal to or more than a predetermined threshold value; and
   a proofreading unit that proofreads the proofreading target sentence, using, out of the post-proofreading sentences selected by the selection unit, a post-proofreading sentence with the highest degree of similarity, wherein
   the proofreading unit replaces a character string of an overlapping part in the pre-proofreading sentence between a common character string between the proofreading target sentence and the pre-proofreading sentence and a different character string between the pre-proofreading sentence and the post-proofreading sentence, by a character string in the post-proofreading sentence corresponding to the overlapping character string, thereby proofreading the proofreading target sentence.

2. The text proofreading apparatus according to claim 1, wherein
   the selection unit determines availability of proofreading by the post-proofreading sentence based on degree of syntactic similarity or degree of semantic similarity between the proofreading target sentence and the post-proofreading sentence.

3. A text proofreading method comprising:
   acquiring post-proofreading sentences corresponding to pre-proofreading sentences, according to a proofreading target sentence;
   selecting, from the acquired post-proofreading sentences, post-proofreading sentences with degrees of similarity between the proofreading target sentence and the post-proofreading sentences equal to or more than a predetermined threshold value; and
   proofreading the proofreading target sentence, using, out of the selected post-proofreading sentences, a post-proofreading sentence with the highest degree of similarity, wherein
   the proofreading includes replacing a character string of an overlapping part in the pre-proofreading sentence between a common character string between the proofreading target sentence and the pre-proofreading sentence and a different character string between the pre-proofreading sentence and the post-proofreading sentence, by a character string in the post-proofreading sentence corresponding to the overlapping character string, thereby proofreading the proofreading target sentence.

* * * * *